United States Patent
Kurokawa et al.

(10) Patent No.: US 12,479,435 B2
(45) Date of Patent: Nov. 25, 2025

(54) DRIVING ASSIST METHOD AND DRIVING ASSIST DEVICE

(71) Applicants: Nissan Motor Co., Ltd., Yokohama (JP); Renault S.A.S., Boulogne-Billancourt (FR)

(72) Inventors: Takato Kurokawa, Kanagawa (JP); Yoshiro Takamatsu, Kanagawa (JP); Yohei Mishina, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 701 days.

(21) Appl. No.: 17/260,249

(22) PCT Filed: Jul. 16, 2018

(86) PCT No.: PCT/IB2018/000956
§ 371 (c)(1),
(2) Date: Jan. 14, 2021

(87) PCT Pub. No.: WO2020/016621
PCT Pub. Date: Jan. 23, 2020

(65) Prior Publication Data
US 2021/0269040 A1    Sep. 2, 2021

(51) Int. Cl.
*G06F 17/00*    (2019.01)
*B60W 30/18*    (2012.01)
(Continued)

(52) U.S. Cl.
CPC ...... *B60W 30/18163* (2013.01); *B60W 40/04* (2013.01); *G06N 5/04* (2013.01);
(Continued)

(58) Field of Classification Search
CPC .......... B60W 30/18163; B60W 40/04; B60W 2520/105; B60W 2552/10;
(Continued)

(56) References Cited

U.S. PATENT DOCUMENTS 10,317,903 B2 *  6/2019  Shashua ................ B60W 30/10
10,384,679 B2 *  8/2019  Fujita .................. G01C 21/3667
(Continued)

FOREIGN PATENT DOCUMENTS

WO    2017/163614 A1    9/2017

OTHER PUBLICATIONS

Lane Change—Intention Inference and Trajectory Prediction of Surrounding Vehicles on Highways (Year: 2023).*
(Continued)

*Primary Examiner* — Ronnie M Mancho
(74) *Attorney, Agent, or Firm* — GLOBAL IP COUNSELORS, LLP

(57) ABSTRACT

A driving assist method performs a lane change control to make a lane change to an adjacent lane. The method includes: detecting whether there is a request from the host vehicle to make a lane change to the adjacent lane; detecting whether there is any intention for another vehicle traveling in the adjacent lane to make a lane change towards the host vehicle lane upon detection of a presence of the lane change; establishing a lane-change-intending other vehicle as a designated vehicle for a place-swapping lane change upon detection of a presence of the intention for another vehicle to make a lane change towards the host vehicle lane; and setting the position of the designated vehicle traveling in the adjacent lane as a target lane change to be made by the host vehicle, and performing a lane change control based on the target lane change.

12 Claims, 10 Drawing Sheets

(51) Int. Cl.
  *B60W 40/04* (2006.01)
  *G06N 5/04* (2023.01)
  *G06N 20/00* (2019.01)
  *G08G 1/16* (2006.01)

(52) U.S. Cl.
  CPC ....... *G06N 20/00* (2019.01); *B60W 2520/105* (2013.01); *B60W 2552/10* (2020.02); *B60W 2554/4041* (2020.02); *B60W 2554/4045* (2020.02); *B60W 2554/406* (2020.02); *B60W 2554/802* (2020.02); *G08G 1/166* (2013.01)

(58) Field of Classification Search
  CPC . B60W 2554/4041; B60W 2554/4045; B60W 2554/406; B60W 2554/802; B60W 2554/801; B60W 60/0027; B60W 40/105; B60W 2520/10; B60W 30/09; B60W 30/10; B60W 30/12; B60W 50/14; G06N 5/04; G06N 20/00; G08G 1/166; G08G 1/096708; G08G 1/096791; G08G 1/167; G08G 1/0962; G08G 1/16; G08G 1/09; B62D 15/0255; B62D 15/0265; B60Y 2300/18166
  USPC .......................................................... 701/25
  See application file for complete search history.

(56) References Cited

U.S. PATENT DOCUMENTS

| | | | | |
|---|---|---|---|---|
| 10,684,621 | B2* | 6/2020 | Matsubara | B60W 10/20 |
| 10,796,574 | B2* | 10/2020 | Mishina | G01C 21/3492 |
| 10,870,435 | B2* | 12/2020 | Fujisawa | G05D 1/0212 |
| 11,124,163 | B2* | 9/2021 | Fujita | B60W 30/0953 |
| 11,148,683 | B2* | 10/2021 | Kaji | B60W 60/001 |
| 11,203,360 | B2* | 12/2021 | Mimura | B60W 50/16 |
| 11,332,164 | B2* | 5/2022 | Kaji | B60W 60/0051 |
| 11,364,930 | B2* | 6/2022 | Kubota | B60K 35/00 |
| 11,511,761 | B2* | 11/2022 | Ochida | B60W 50/035 |
| 11,548,508 | B2* | 1/2023 | Taniguchi | B60W 60/001 |
| 11,565,713 | B2* | 1/2023 | Mimura | B60W 30/0956 |
| 11,584,388 | B2* | 2/2023 | Takamatsu | G01S 13/867 |
| 11,661,062 | B2* | 5/2023 | Taniguchi | B60W 40/04 701/41 |
| 11,697,416 | B2* | 7/2023 | Takamatsu | B60W 60/0021 701/25 |
| 11,731,665 | B2* | 8/2023 | Takamatsu | B60W 60/0055 701/23 |
| 2004/0148063 | A1* | 7/2004 | Patchell | B60T 17/22 701/1 |
| 2011/0190972 | A1* | 8/2011 | Timmons | G08G 1/167 701/31.4 |
| 2017/0248959 | A1* | 8/2017 | Matsubara | B60W 30/12 |
| 2017/0259819 | A1* | 9/2017 | Takeda | B60W 30/162 |
| 2017/0327114 | A1* | 11/2017 | Saito | B60W 30/18 |
| 2018/0178802 | A1* | 6/2018 | Miyata | B60W 50/14 |
| 2018/0297611 | A1* | 10/2018 | Fujisawa | G08G 1/167 |
| 2020/0066160 | A1* | 2/2020 | Mishina | G08G 1/167 |
| 2020/0110422 | A1* | 4/2020 | Takamatsu | B60W 30/18163 |
| 2020/0298842 | A1* | 9/2020 | Takamatsu | B60W 30/09 |
| 2020/0298877 | A1* | 9/2020 | Takamatsu | G01C 21/3492 |
| 2021/0122375 | A1* | 4/2021 | Takamatsu | G01C 21/3407 |
| 2021/0146943 | A1* | 5/2021 | Oniwa | B60R 21/00 |
| 2021/0146962 | A1* | 5/2021 | Kaji | B60W 30/17 |
| 2021/0155242 | A1* | 5/2021 | Taniguchi | B60W 50/10 |
| 2021/0155243 | A1* | 5/2021 | Taniguchi | B60W 40/04 |
| 2021/0163026 | A1* | 6/2021 | Ochida | B60W 60/0015 |
| 2021/0253104 | A1* | 8/2021 | Takamatsu | B60W 60/0021 |
| 2021/0253107 | A1* | 8/2021 | Takamatsu | G08G 1/167 |
| 2021/0269040 | A1* | 9/2021 | Kurokawa | B62D 15/0265 |

OTHER PUBLICATIONS

Lane Change—Intention Inference and Trajectory Prediction of Surrounding Vehicles on Highways (Year: 2023) (Year: 2023).*

* cited by examiner

DRIVING ASSIST METHOD AND DRIVING ASSIST DEVICE

CROSS-REFERENCE TO RELATED APPLICATIONS

This application is a U.S. national stage application of International Application No. PCT/IB2018/000956, filed on Jul. 16, 2018.

BACKGROUND

Technical Field

The present invention relates to a driving assist method and a driving assist device.

Background Information

In the past, other-vehicle information acquisition units that acquire information pertaining to other vehicles via communication, and exterior recognition units that perform recognition of the exterior of a host vehicle via sensing, have been provided. Vehicle control devices in which such exterior recognition devices sense an other-vehicle surroundings space of other-vehicle surroundings on the basis of the acquired information have been known (e.g., International Publication No. 2017/163614 referred to as patent document 1).

SUMMARY

In prior-art devices, in cases where a host vehicle performs a lane change, it is expected that other vehicles will decelerate or perform lane changes to lanes other than the host vehicle travel lane, and other-vehicle surrounding spaces are sensed. However, the prior art does not disclose a method in which the host vehicle is caused to make a lane change to an adjacent lane when the sensed surrounding spaces between the other vehicles are not sufficiently ensured. Therefore, a drawback is presented in that, in scenarios in which the host vehicle is to make a lane change to an adjacent lane in a road having an X-shaped merge location, a plurality of lanes, etc., the host vehicle will be unable to make the lane change in cases where there is not a sufficient area of space before the lane change.

The present invention was contrived in view of the problem described above, it being an object of the present invention to yield a configuration such that, in a scenario in which the host vehicle makes a lane change to an adjacent lane, it will be possible for the host vehicle to execute the lane change using an area in which another vehicle is traveling, even in situations where there is not a sufficient area of space before the lane change by the host vehicle.

In order to achieve the object described above, the present invention is a driving assist method using controller to perform a lane change control of a host vehicle traveling in a host vehicle lane to make a lane change to an adjacent lane in which another vehicle present is traveling in a surrounding of the host vehicle, the method being implemented through the following procedures:
detecting whether there is a request from the host vehicle to make a lane change to the adjacent lane;
detecting whether there is any intention for another vehicle traveling in the adjacent lane to make a lane change towards the host vehicle lane upon detection of a presence of the request from the host vehicle to make a lane change;
establishing a lane-change-intending other vehicle as a vehicle designated for a place-swapping lane change upon detection of a presence of the intention for another vehicle to make a lane change towards the host vehicle lane; and
setting a position of a vacant area that will be created due to the lane change by the designated vehicle as a lane change target to be made by the host vehicle.

Thus, a lane-change-intending other vehicle is established as a vehicle designated for a place-swapping lane change, and the position of a vacant area that will be created due to a lane change by the designated vehicle is set as a target for a lane change made by a host vehicle. As a result, in scenarios in which the host vehicle requests a lane change to an adjacent lane, it is possible for the host vehicle to make a lane change to the position of the designated vehicle, which makes a lane change to the host vehicle lane, even in situations where there is not a sufficient vacant area before the lane change by the host vehicle.

BRIEF DESCRIPTION OF THE DRAWINGS

Referring now to the attached drawings which form a part of this original disclosure.

DETAILED DESCRIPTION OF EMBODIMENTS

Figure 1:
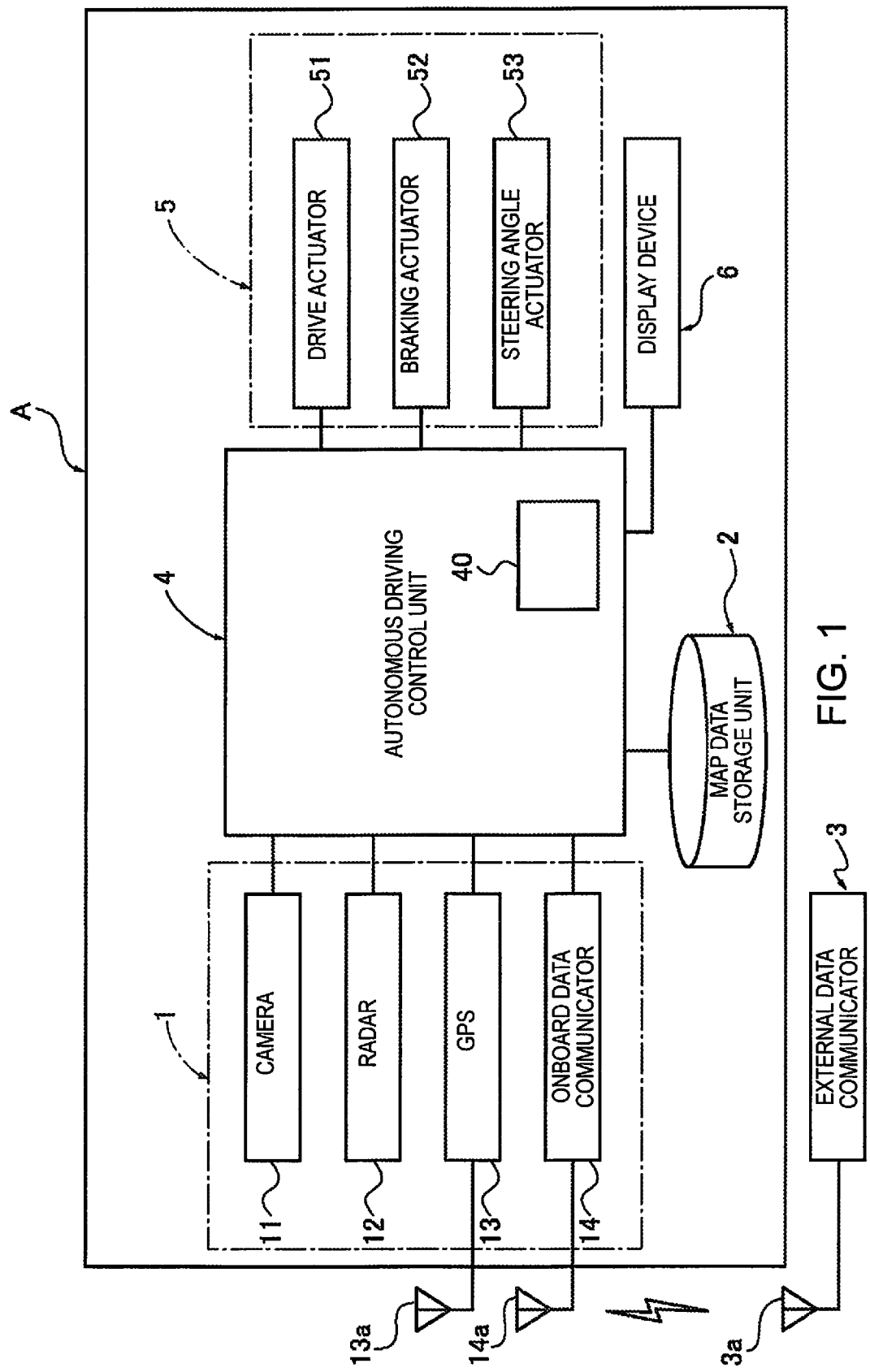
FIG. 1 is an overall system diagram showing an autonomous driving control system to which a driving assist method and a driving assist device are applied in accordance with a first embodiment.

A preferred embodiment of the driving assist method and the driving assist device of the present invention is described below on the basis of the first embodiment shown in the drawings.

First Embodiment

The driving assist method and the driving assist device in the first embodiment are applied to an autonomously driven vehicle (one example of a driving assist vehicle) in which travel route information generated by an autonomous driving control unit is used to autonomously control drive/braking/steering in accordance with selection of an autonomous driving mode. The configurations in the first embodiment are described below in each of "Overall System Configuration," "Control Block Configuration of Lane Change Controller," "Overall Configuration of Process for Lane Change Control," and "Configuration of Process for Lane Change Operation Determination."

Overall System Configuration

FIG. 1 shows an autonomous driving control system to which the driving assist method and the driving assist device of the first embodiment are applied. The overall system configuration is described below on the basis of FIG. 1.

An autonomous driving system A is provided with an onboard sensor 1, a map data storage unit 2, an external data communicator 3, an autonomous driving control unit 4, an actuator 5, and a display device 6.

The onboard sensor 1 has a camera 11, a radar 12, a GPS 13, and an onboard data communicator 14. Sensor information acquired by the onboard sensor 1 is outputted to the autonomous driving control unit 4.

The camera 11 is a surroundings recognition sensor that carries out a function of acquiring host vehicle surroundings information such as lanes, preceding vehicles, and pedestrians from image data, as a function needed for autonomous driving. The camera 11 is configured by combining, for example, a host vehicle forward recognition camera, a rearward recognition camera, a rightward recognition camera, a leftward recognition camera, etc.

Objects on the host vehicle travel roadway, lanes, objects outside of the host vehicle travel roadway (road structures, preceding vehicles, succeeding vehicles, oncoming vehicles, surrounding vehicles, pedestrians, bicycles, motorcycles), the host vehicle travel roadway (white road lines, road borders, stop lines, crosswalks), road signs (speed limits), etc., are sensed by the camera 11.

The radar 12 is a distance measurement sensor that carries out a function of sensing the presence of objects in the surroundings of the host vehicle and the function of sensing distances to objects in the surroundings of the host vehicle, as functions needed for autonomous driving. "Radar 12" in this example is a general term including radar using radio waves, lidar using light, and sonar using ultrasonic waves. For example, laser radar, milliwave radar, ultrasonic radar, a laser range finder, etc., can be used as the radar 12. The radar 12 is configured by combining, for example, host vehicle forward radar, rearward radar, rightward radar, leftward radar, etc.

Positions of objects on the host vehicle travel roadway, objects outside of the host vehicle travel roadway (road structures, preceding vehicles, succeeding vehicles, oncoming vehicles, surrounding vehicles, pedestrians, bicycles, motorcycles), etc., are sensed and distances to the objects are sensed by the radar 12. If a viewing angle is insufficient, viewing angle may be added as appropriate.

The GPS 13 is a host vehicle position sensor that has a GNSS antenna 13a and uses satellite communication to sense the host vehicle position (latitude and longitude) while the host vehicle is stopped or traveling. "GNSS" is an abbreviation of "Global Navigation Satellite System," and "GPS" is an abbreviation of "Global Positioning System."

The onboard data communicator 14 is an external data sensor that wirelessly communicates with the external data communicator 3 via transceiver antennas 3a, 14a, and thereby acquires information that cannot be acquired from the host vehicle.

In cases where the external data communicator 3 is, for example, a data communicator mounted in another vehicle traveling in the vicinity of the host vehicle, vehicle-to-vehicle communication is performed between the host vehicle and the other vehicle. Information necessary to the host vehicle can be acquired, by request from the onboard data communicator 14, from among a variety of information retained in the other vehicle, the acquisition being made via the vehicle-to-vehicle communication.

In cases where the external data communicator 3 is, for example, a data communicator provided to infrastructure equipment, vehicle-to-infrastructure communication is performed between the host vehicle and the infrastructure equipment. Information necessary to the host vehicle can be acquired, by request from the onboard data communicator 14, from among a variety of information retained in the infrastructure equipment, the acquisition being made via the vehicle-to-infrastructure communication. In cases where the held information has, e.g., information that map data saved in the map data storage unit 2 lacks, or information changed from that in the map data, it is possible for the lacking information/changed information to be supplementarily provided. In addition, it is possible to acquire traffic information, such as congestion information or travel restriction information, pertaining to a target travel route on which the host vehicle is planned to travel. The map data storage unit 2 is configured from an onboard memory that contains "electronic map data," in which map information and latitude/longitude are associated. The map data contained in the map data storage unit 2 is high-precision map data having a level of precision such that it is possible at least to recognize lanes on a road having a plurality of lanes. Using the high-precision map data makes it possible to draw a target travel route with regard for which lane the host vehicle is traveling in from among the plurality of lanes during autonomous driving. When the host vehicle position sensed by the GPS 13 is recognized as host vehicle position information by the autonomous driving control unit 4, the map data storage unit 2 sends high-precision map data centered on the host vehicle position to the autonomous driving control unit 4.

The high-precision map data has road information associated with each location, the road information being defined by nodes and links that connect the nodes. The road information includes: information that specifies the road according to the position/area of the road; and information pertaining to road classification for each road, a road width for each road, and a road shape. The road information is stored, for each item of discrimination information pertaining to the road links, in association with other information relating to roads, such as a classification of a road, a width of the road, a shape of the road, the possibility of advancing straight forward, a priority relationship pertaining to advancement, the possibility of passing other vehicles (possibility of entering an adjacent lane), a speed limit, and road signs.

The autonomous driving control unit 4 has a function for integrated processing of input information from the onboard sensor 1 or the map data storage unit 2 to generate a target travel route, a target speed profile (including an acceleration profile and/or a deceleration profile), etc. Specifically, a travel-lane-level-dependent target travel route from a current location to a destination is generated on the basis of, inter alia, the high-precision map data from the map data storage unit 2 or a prescribed route search technique, and, inter alia, a target speed profile aligned with the target travel route is generated. Furthermore, when it has been assessed, due to sensing results pertaining to the host vehicle surroundings as acquired by the onboard sensor 1 during stopping/traveling of the host vehicle that aligns with the target travel route, that autonomous driving cannot be maintained, the target travel route, the target speed profile, etc., are successively corrected on the basis of the sensing results pertaining to the host vehicle surroundings.

The autonomous driving control unit 4: computes, upon generation of the target travel route, a drive command value/braking command value/steering command value so that the host vehicle travels along the target travel route; outputs the computed command values to respective actuators; and causes the host vehicle to travel/stop along the target travel route. Specifically, a result from computing of the drive command value is outputted to a drive actuator 51, a result from computing of the braking command value is outputted to a braking actuator 52, and a result from computing of the steering command value is outputted to a steering angle actuator 53.

The actuator 5 is a control actuator for causing the host vehicle to travel/stop along the target travel route. The actuator 5 has the drive actuator 51, the braking actuator 52, and the steering angle actuator 53.

The drive actuator 51 is an actuator that receives input of a drive command value from the autonomous driving control unit 4 and controls drive force outputted to drive wheels. As the drive actuator 51, for example, an engine is used in the case of an engine vehicle, an engine and a motor/generator (drive force) are used in the case of a hybrid vehicle, and a motor/generator (drive force) is used in the case of an electric automobile.

The braking actuator 52 is an actuator that receives input of a braking command value from the autonomous driving control unit 4 and controls braking force outputted to the drive wheels. For example, a hydraulic booster, an electric booster, a brake fluid pressure actuator, a brake motor actuator, a motor/generator (regenerative), etc., is used as the braking actuator 52.

The steering angle actuator 53 is an actuator that receives input of a steering angle command value from the autonomous driving control unit 4 and controls the steering angle of steered wheels. A turning motor, etc., provided to a steering force transmission system of a steering system is used as the steering angle actuator 53.

The display device 6 is a device that displays a screen image pertaining to, inter alia, where on a map the host vehicle is moving during stopping/traveling caused by the autonomous driving, and provides visual information pertaining to the host vehicle position to a driver and/or a passenger. The display device 6 receives input of the target travel route information, the host vehicle position information, the destination information, etc., generated by the autonomous driving control unit 4, and displays a map, a road, the target travel route (travel route of the host vehicle), the host vehicle position, the destination, etc., on a display screen image in a readily visible manner.

The autonomous driving control unit 4 of the autonomous driving system A is provided with a lane change controller 40 (controller) that performs a lane change control on the basis of prescribed control rules when the host vehicle traveling in the host vehicle lane makes a lane change to an adjacent lane in which another vehicle in the surroundings of the host vehicle is traveling.

Control Block Configuration of Lane Change Controller

Figure 2:
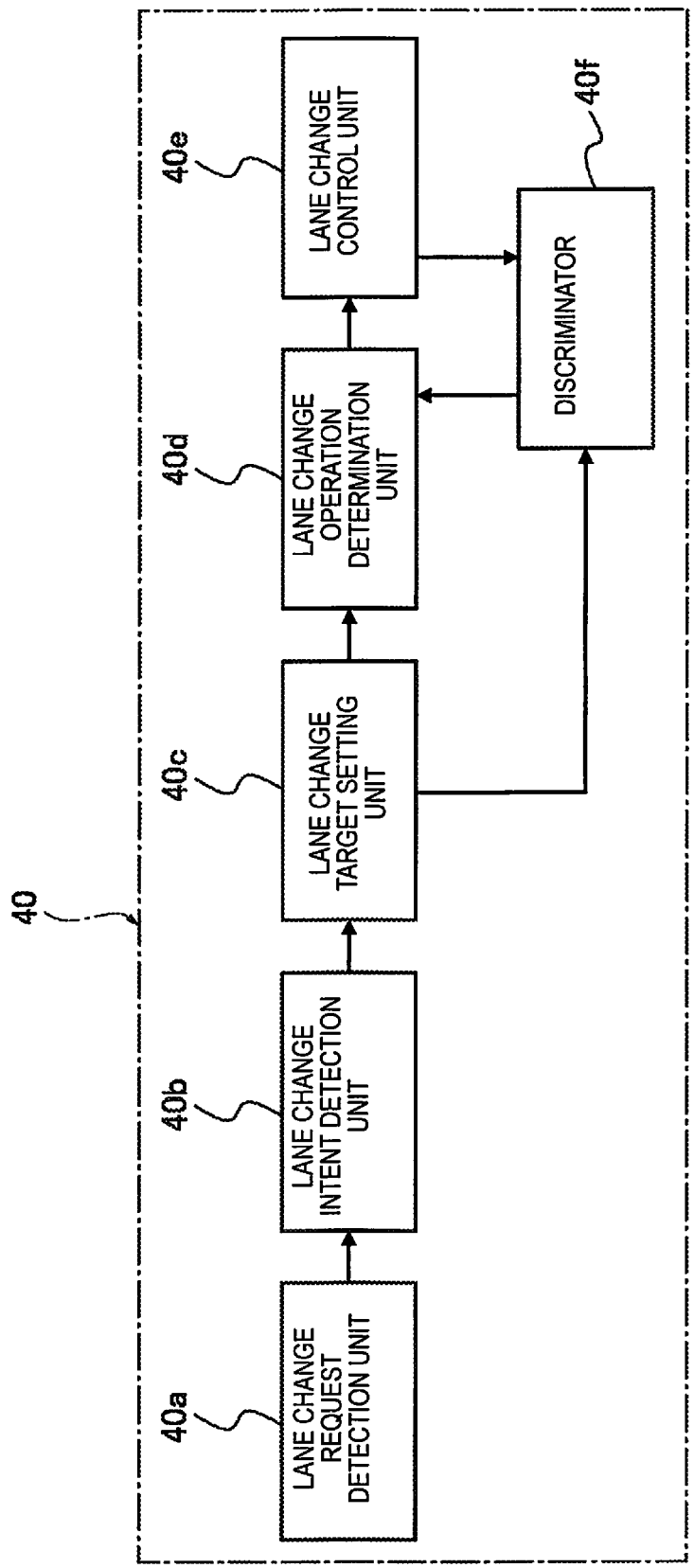
FIG. 2 is a control block diagram showing a lane change controller provided to an autonomous driving control unit.

FIG. 2 shows the lane change controller 40 provided to the autonomous driving control unit 4. A control block configuration of the lane change controller 40 is described below on the basis of FIG. 2.

The lane change controller 40 is provided with a lane change request detection unit 40a, a lane change intent detection unit 40b, a lane-change-target-setting unit 40c, a lane change operation determination unit 40d, a lane change control unit 40e, and a discriminator 40f.

The lane change request detection unit 40a detects whether there is a request from the host vehicle to make a lane change to an adjacent lane. The detection of the request from the host vehicle to make a lane change to an adjacent lane is performed using detection methods such as those described in (a) and (b) below.

(a) It is detected that driving intervention information pertaining to manual intervention by the driver in driving of the vehicle has been produced, and that a lane change by the host vehicle to an adjacent lane has been made (driver request). For example, [this scenario] is detected according to turn signal illumination and/or an illumination manipulation. Other manipulations for steering to an adjacent lane made by the driver are also detected.

(b) It is detected that a lane change command has been outputted by the autonomous driving control unit 4 (system request). For example, a flag signal outputted when an assessment pertaining to a lane change is made may be detected, and a configuration may be adopted in which a lane change to an adjacent lane according to a target travel route calculated by the autonomous driving control unit 4 is detected.

In cases where it has been detected that there is a request from the host vehicle to make a lane change, the lane change intent detection unit 40b detects whether there is any intent for another vehicle traveling in an adjacent lane to make a lane change heading toward the host vehicle lane.

A lane-change-intending other vehicle is detected using detection methods such as those described in (a) to (d) below.

(a) The other vehicle is detected due to having illuminated a turn signal.

(b) Behavior in which the other vehicle heads toward the host vehicle lane is detected, and the fact that preparation for a lane change has started is detected.

(c) The other vehicle is detected in cases where the other vehicle accelerates toward a headway space of a vehicle during travel in the host vehicle lane.

(d) Information that the other vehicle plans to execute a lane change is inputted via vehicle-to-vehicle communication between the host vehicle and the other vehicle, whereby the other vehicle is detected. Vehicles that perform vehicle-to-vehicle communication are limited to vehicles, from among a plurality of vehicles traveling in adjacent lanes, for which the arrival time at another vehicle position is earlier than a dead point arrival prediction time at which the host vehicle will arrive at a dead point. The "dead point" is an endpoint at which the host vehicle will become unable to complete a lane change to an adjacent lane when making the lane change, the dead point being present in front of the host vehicle.

In cases where it has been detected that there is an intent for another vehicle to make a lane change heading toward the host vehicle lane, the lane-change-target-setting unit 40c establishes the lane-change-intending other vehicle as a vehicle designated for a place-swapping lane change, and sets a vacant area created due to the lane change by the designated vehicle as a target for a lane change made by the host vehicle. In this instance, the relative position of the designated vehicle relative to the host vehicle is detected, and the relative position of the designated vehicle relative to the host vehicle is established as the position of a vacant area and is set as the target for a lane change made by the host vehicle.

Before the designated vehicle makes a lane change, the "position of the vacant area" refers to a current position of the designated vehicle, such that the vacant area will be created due to the designated vehicle making a lane change. After the designated vehicle has made a lane change, the "position of the vacant area" refers to the position where the vacant area is created due to the designated vehicle leaving the adjacent lane. Thus, as pertains to the "position of the vacant area," before a lane change is started and while the host vehicle and the designated vehicle are running in parallel in respective lanes, the relative position of the designated vehicle relative to the host vehicle is detected, the relative position where the designated vehicle is present relative to the host vehicle is established as a vacant area, and the vacant area is set as the target for a lane change made by the host vehicle. Specifically, the "position of the vacant area" includes the current position of the designated vehicle relative to the host vehicle, this current position actually not being a vacant area, and therefore what is detected is not a vacant space but rather the relative position of the designated vehicle relative to the host vehicle.

In cases where only one lane-change-intending other vehicle is present, the one other vehicle is established as the vehicle designated for the place-swapping lane change. However, in cases where a plurality of lane-change-intending other vehicles are present, another vehicle having the lowest lane change risk value from among the plurality of other vehicles is established as the vehicle designated for the place-swapping lane change.

In cases where the target for a lane change made by the host vehicle is set, the lane change operation determination unit 40d determines an interoperation pertaining to the lane change involving a swapping of places by the host vehicle and the designated vehicle. Basically, the lane change involving a swapping of places by the host vehicle and the designated vehicle is categorized into [one of] the pre-patterned interoperation patterns (A) to (F) described below. One pattern from among the interoperation patterns (A) to (F), which are categorized in accordance with a variety of assessment conditions, is selected, and the interoperation pattern of the lane change involving a swapping of places by the host vehicle and the designated vehicle is determined.

Figure 3:
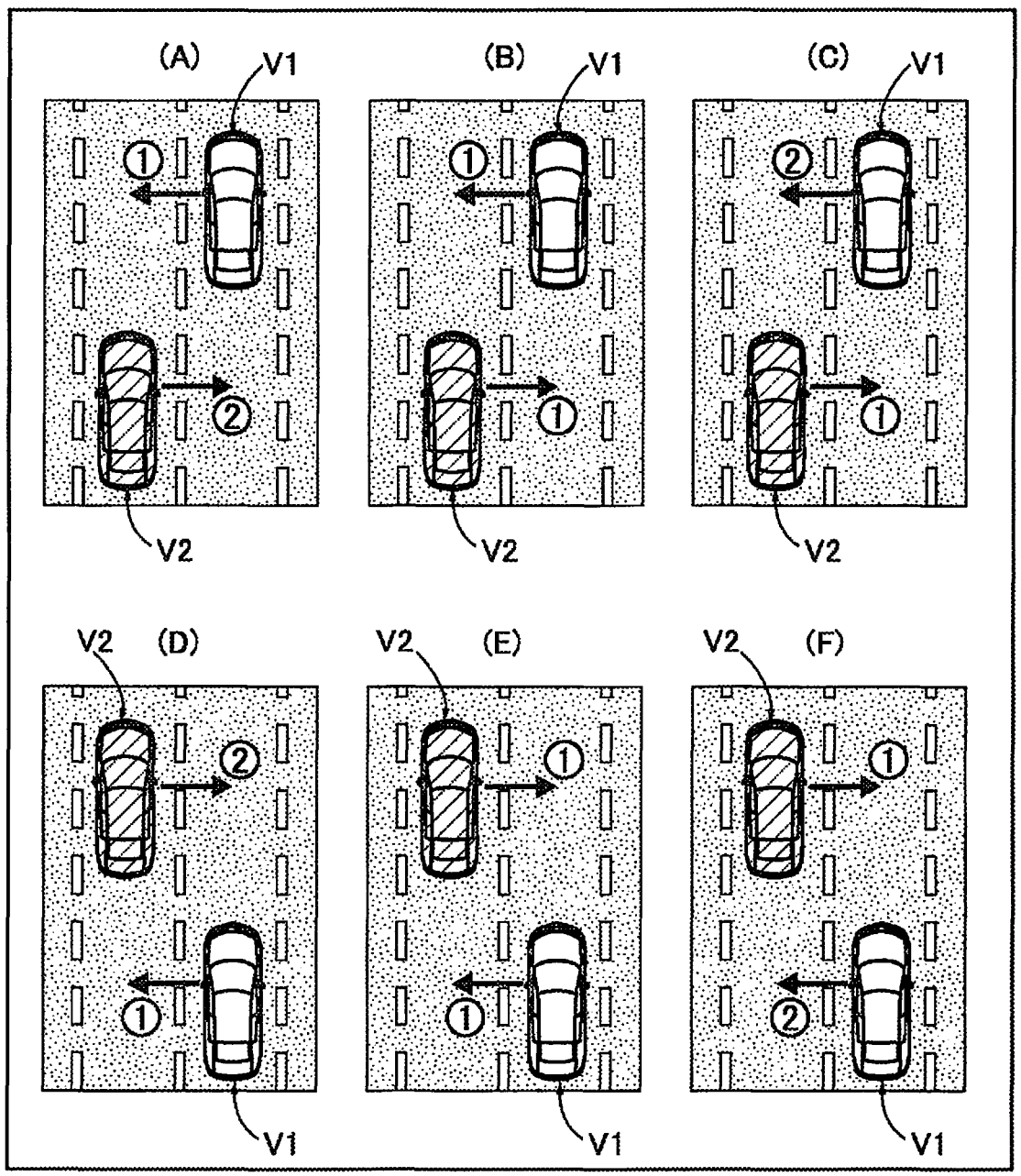
FIG. 3 is an operation pattern diagram showing interoperation patterns (A) to (F) in which lane change operations involving a swapping of places by a host vehicle and a designated vehicle are patterned and categorized.

The interoperation patterns (A) to (F) are as shown in FIG. 3. In FIG. 3, V1 represents the host vehicle, and V2 represents the designated vehicle.

(A) The host vehicle V1 is forward from the designated vehicle V2 and starts a lane change in advance of the designated vehicle V2.

(B) The host vehicle V1 is forward from the designated vehicle V2 and starts a lane change at the same time as the designated vehicle V2.

(C) The host vehicle V1 is forward from the designated vehicle V2 and starts a lane change after the designated vehicle V2.

(D) The host vehicle V1 is rearward from the designated vehicle V2 and starts a lane change in advance of the designated vehicle V2.

(E) The host vehicle V1 is rearward from the designated vehicle V2 and starts a lane change at the same time as the designated vehicle V2.

(F) The host vehicle V1 is rearward from the designated vehicle V2 and starts a lane change after the designated vehicle V2.

When the interoperation of the lane change involving a swapping of places by the host vehicle and the designated vehicle is determined by the lane change operation determination unit 40d, the lane change control unit 40e controls a lane change operation of the host vehicle so as to achieve the determined place-swapping lane change.

When the host vehicle has undergone the lane change involving a swapping of places by the host vehicle and the designated vehicle, the discriminator 40f stores and saves a result from categorizing a surrounding environment that includes the host vehicle and the designated vehicle for each selected interoperation pattern (A) to (F). In cases where the target lane change to be made by the host vehicle V1 is set, when an assessment is made by the lane change operation determination unit 40d that the surrounding environment at the time of such setting conforms to any of the categorization results obtained by learning, an interoperation pattern in the instance of the assessed categorization result is read out from the discriminator 40f and selected.

Overall Configuration of Process for Lane Change Control

Figure 4:
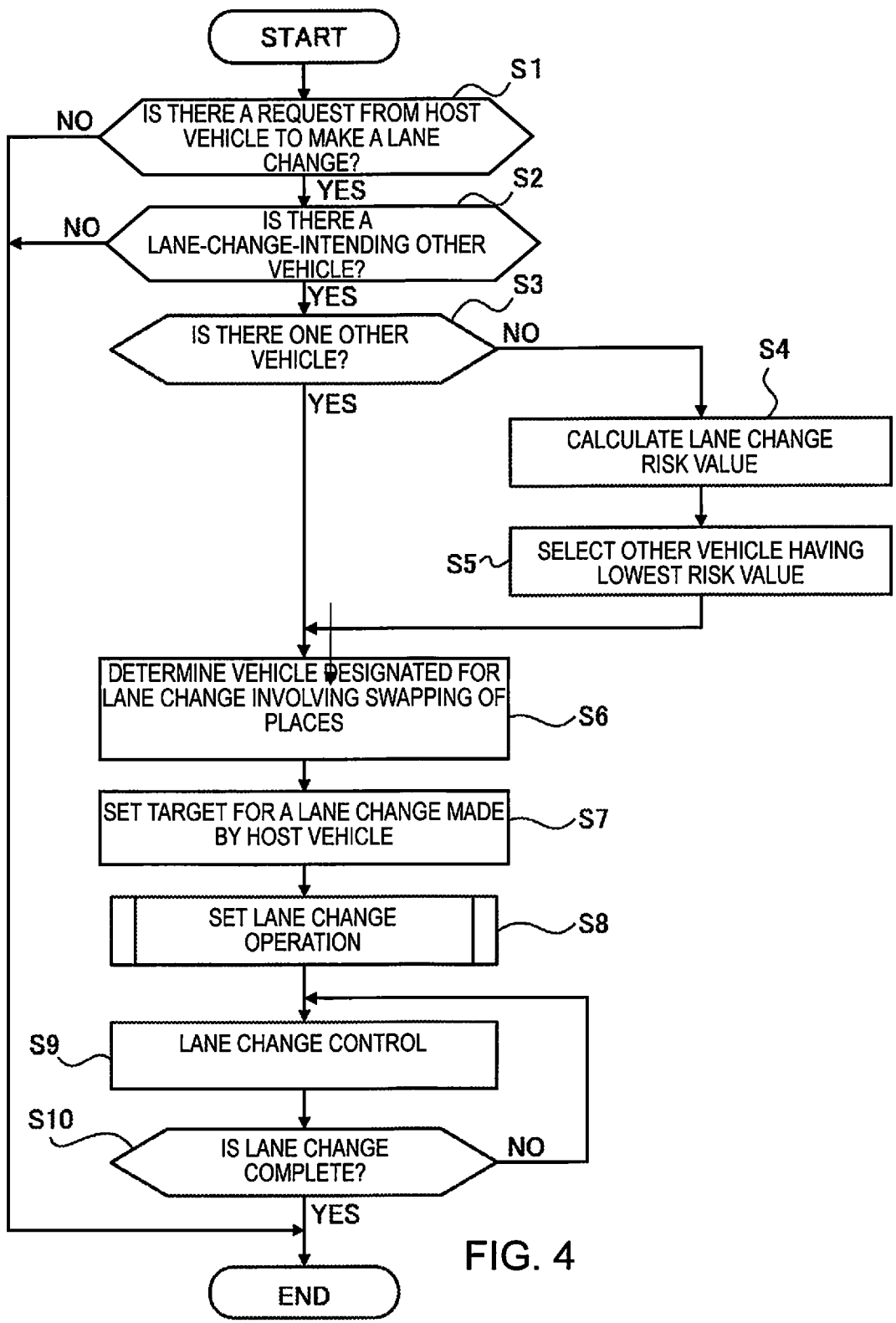
FIG. 4 is a flow chart showing an overall flow of a lane change control process executed by the lane change controller provided to the autonomous driving control unit.

FIG. 4 shows an overall flow of a lane change control process executed by the lane change controller 40 provided to the autonomous driving control unit 4. The steps in FIG. 4 are described below.

In step S1, in continuation from the start of the process, an assessment is made as to whether there is a request from the host vehicle to make a lane change from a host vehicle lane to an adjacent lane. When the assessment is YES (there is a request from the host vehicle to make a lane change), the process advances to step S2; when the assessment is NO (there is no request from the host vehicle to make a lane change), the process ends.

In step S2, in continuation from the assessment in step S1 that there is a request from the host vehicle to make a lane change, an assessment is made as to whether a lane-change-intending other vehicle is present among (one or a plurality of) vehicles in the surroundings of the host vehicle, the vehicles traveling in an adjacent lane. When the assessment is YES (a lane-change-intending other vehicle is present), the process advances to step S3; when the assessment is NO (no lane-change-intending other vehicle is present), the process ends.

In step S3, in continuation from the assessment in step S2 that a lane-change-intending other vehicle is present, an assessment is made as to whether there is one lane-change-intending other vehicle. When the assessment is YES (there is one other vehicle), the process advances to step S6, when the assessment is NO (there are a plurality of other vehicles), the process advances to step S4.

In step S4, in continuation from the assessment in step S3 that there are a plurality of lane-change-intending other vehicles, lane change risk values are calculated for each of the plurality of other vehicles, and the process advances to step S5.

The lane change risk values R are calculated as follows:

$$R = f(La, Lo, Sa, So, Pa, Po)$$

where La is the headway distance to a vehicle traveling in the host vehicle lane, Lo is the headway distance to a vehicle traveling in an adjacent lane, Sa is the speed of the vehicle traveling in the host vehicle lane, So is the speed of the vehicle traveling in the adjacent lane, Pa is the vehicle position of the vehicle traveling in the host vehicle lane, and Po is the vehicle position of the vehicle traveling in the adjacent lane.

The function expression for the lane change risk values R is based on numerous experimental results, and is such that the lane change risk values R are set to a lower value commensurately with a higher headway distance, the lane change risk values R are set to a lower value commensurately with a lower speed, and the lane change risks R are set to a lower value commensurately with a lower number of traveling vehicles.

In step S5, in continuation from the calculation in step S4 of the lane change risk value, the other vehicle having the lowest risk value among the lane change risk values of the plurality of lane-change-intending other vehicles is selected, and the process advances to step S6.

In step S6, in continuation from the assessment in step S3 that there is one other vehicle or the selection in step S5 of the other vehicle having the lowest rick value, the one other vehicle or the other vehicle having the lowest risk value is determined to be the designated vehicle in the place-swapping lane change, and the process advances to step S7.

In step S7, in continuation from the determination in step S6 as to the designated vehicle in the place-swapping lane change, the position (relative position) of a vacant area in the adjacent lane that will be created due to a lane change by the designated vehicle is set as the target for a lane change made by the host vehicle, and the process advances to step S8.

Because the "target for a lane change" is the position (relative position) of a vacant area in the adjacent lane that will be created due to a lane change by the traveling designated vehicle, there is no fixed target position; rather, the "target for a lane change" is a variable target position for which the relative positional relationship with respect to the host vehicle moves as time elapses in association with the lane change operation of the designated vehicle.

Figure 5:
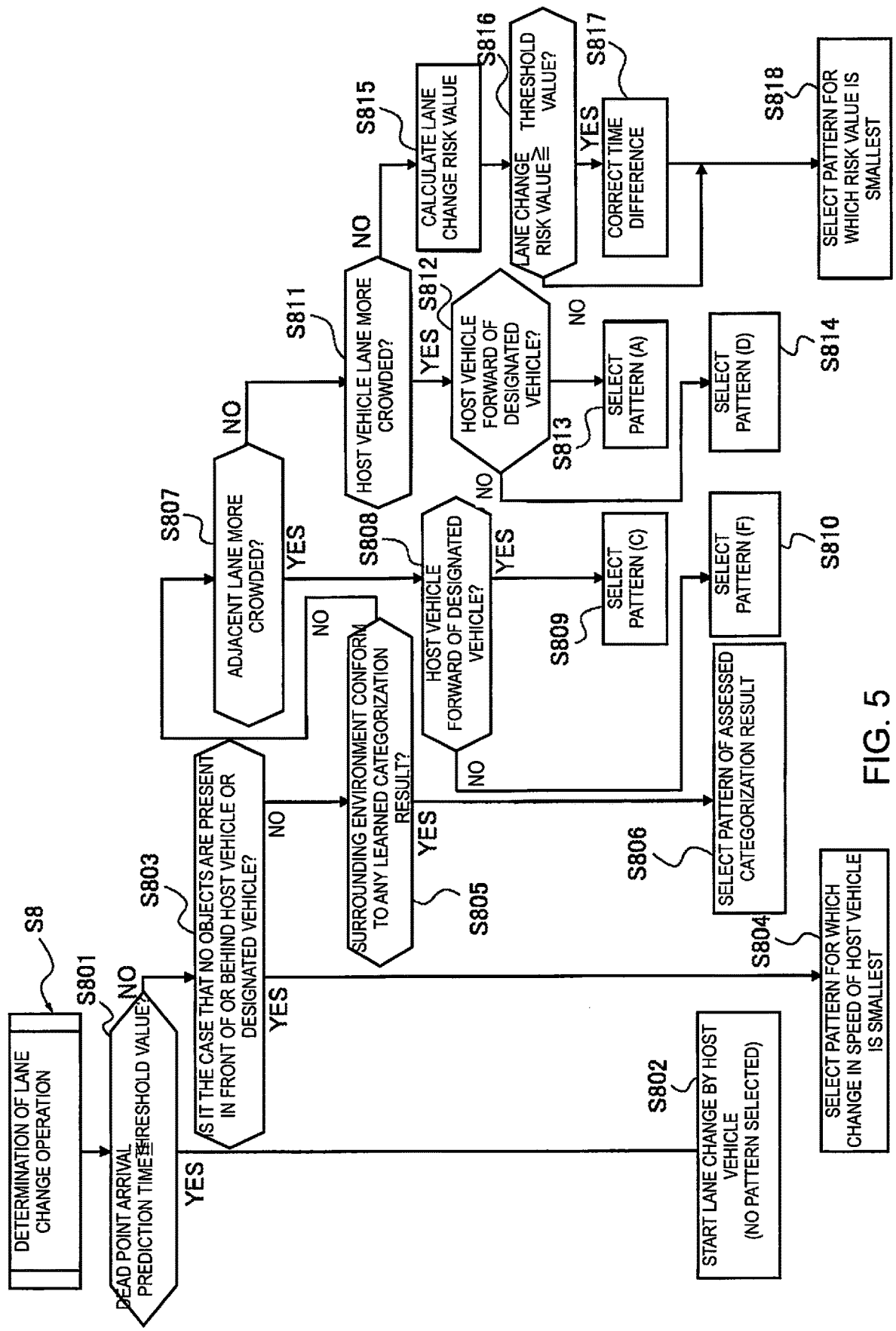
FIG. 5 is a flow chart showing a flow of a lane change operation determination process executed in a lane change operation determination step of the lane change control process.

In step S8, in continuation from the setting in step S7 of the target for a lane change made by the host vehicle, a lane change operation of the host vehicle and the designated vehicle is determined in accordance with the flow chart shown in FIG. 5, and the process advances to step S9.

In step S9, in continuation from the determination in step S8 of the lane change operation or the assessment in step S10 that a lane change is not yet complete, a lane change control is executed according to the determined lane change operation, and the process advances to step S10.

In step S10, in continuation from the execution in step S9 of the lane change control, an assessment is made as to whether the lane change involving a swapping of places by the host vehicle and the designated vehicle has been completed. When the assessment is YES (lane change is complete), the process ends; when the assessment is NO (lane change is not yet complete), the process returns to step S9.

Configuration of Process for Lane Change Operation Determination

FIG. 5 shows a flow of a lane change operation determination process executed in the lane change operation determination step S8 of the lane change control process. The steps in FIG. 5 are described below.

In step S801, in continuation from the start of the lane change operation determination process, a dead point arrival prediction time required for the host vehicle to arrive at a dead point is calculated, and an assessment is made as to whether the dead point arrival prediction time is less than or equal to a threshold value. When the assessment is YES (dead point arrival prediction time is less than or equal to the threshold value), the process advances to step S802; when the assessment is NO (dead point arrival prediction time is greater than the threshold value), the process advances to step S803.

Figure 6:
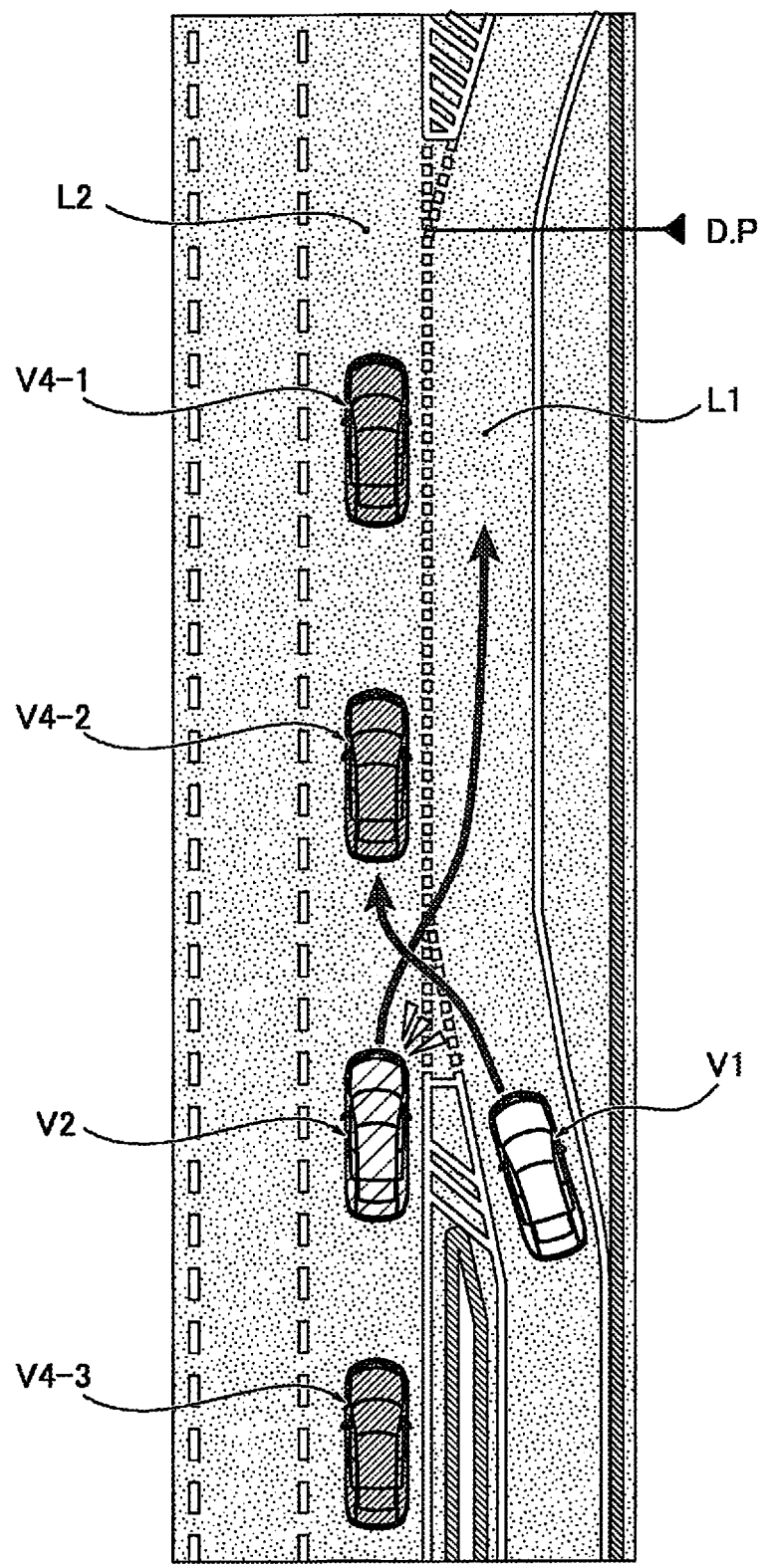
FIG. 6 is an action schematic diagram showing a lane change action involving a swapping of places by the host vehicle and the designated vehicle on a road having an X-shaped merge location.

As pertains to the "dead point," for example, in the case of a road that merges in an X shape, the "D.P" shown in FIG. 6 is a dead point. In the case of a road that branches in a Y shape, the branch point at which the road is divided into two roadways serves as a dead point. The "dead point arrival prediction time" is calculated according to the speed of the host vehicle, the host vehicle position, and a distance remaining to the dead point. In cases where the host vehicle is traveling on a road in which a plurality of lanes extending parallel to each other are present, there is no dead point, and the dead point arrival prediction time is infinite. When any of the interoperation patterns (A) to (F) has been selected, the "threshold value" is set to a value derived from a minimum required time for the place-swapping lane change operation to be made according to the selected pattern. Specifically, the assessment that the dead point arrival prediction time is less than or equal to the threshold value refers to a situation in which any of the interoperation patterns (A) to (F) has been selected and there is no temporal margin for making the place-swapping lane change according to the selected pattern.

In step S802, in continuation from the assessment in step S801 that the dead point arrival prediction time is less than or equal to the threshold value, a lane change by the host vehicle is started immediately instead of a pattern operation, without selecting any of the interoperation patterns (A) to (F).

In step S803, in continuation from the assessment in step S801 that the dead point arrival prediction time is greater than the threshold value, an assessment is made as to whether it is the case that no objects (traveling vehicles, stopped vehicles, etc.) are present in front of or behind the host vehicle or the designated vehicle. When the assessment is YES (no objects are present in front or behind), the process advances to step S804; when the assessment is NO (an object is present in front or behind), the process advances to step S805.

In step S804, in continuation from the assessment in step S803 that no objects are present in front or behind, a change in speed from the current speed of the host vehicle when the place-swapping lane change is made is calculated for each of the patterns (A) to (F), and the interoperation pattern for which the change in speed is smallest is selected.

In step S805, in continuation from the assessment in step S803 that an object is present in front or behind, an assessment is made as to whether the surrounding environment, which is formed by vehicles traveling in the host vehicle lane and vehicles traveling in the adjacent lane, conforms to any learned categorization result. When the assessment is YES (the surrounding environment conforms to a categorization result), the process advances to step S806; when the assessment is NO (the surrounding environment does not conform to a categorization result), the process advances to step S807.

The "learned categorization result" is a categorization result that is stored and saved by the discriminator 40f each time the host vehicle undergoes the lane change involving a swapping of places by the host vehicle and the designated vehicle, the categorization result pertaining to a surrounding environment that includes the host vehicle and the designated vehicle.

In step S806, in continuation from the assessment in step S805 that the surrounding environment conforms to a categorization result, the pattern that corresponds to the assessed categorization result is selected. The pattern that corresponds to the assessed categorization result is selected according to reading from the discriminator 40f, in which the result from categorizing the surrounding environment is stored and saved together with one selected pattern from among the interoperation patterns (A) to (F).

In step S807, in continuation from the assessment in step S805 that the surrounding environment does not conform to a categorization result, an assessment is made as to whether the adjacent lane is more crowded than the host vehicle lane. When the assessment is YES (the adjacent lane is more crowded), the process advances to step S808; when the assessment is NO (the adjacent lane is not more crowded), the process advances to step S811.

The extent of crowding of the host vehicle lane and the adjacent lane is set according to a range in which a crowding identification section can be sensed by the onboard sensor 1, the crowding identification section including the host vehicle and the designated vehicle, and being of the same distance as a distance that can be subject to the place-swapping lane change by the host vehicle. The degree of crowding of the host vehicle lane is calculated according to the number of vehicles present in the crowding identification section in the host vehicle lane, and the degree of crowding of the adjacent lane is calculated according to the number of vehicles present in the crowding identification section in the adjacent lane. When the difference between the degree of crowding in the adjacent lane and the degree of crowding in the host vehicle lane is greater than or equal to a threshold value, it is assessed that the adjacent lane is more crowded.

In step S808, in continuation from the assessment in step S807 that the adjacent lane is more crowded, an assessment is made as to whether the host vehicle is forward from the designated vehicle. When the assessment is YES (the host vehicle is forward from the designated vehicle), the process advances to step S809; when the assessment is NO (the host vehicle is rearward from the designated vehicle), the process advances to step S810.

In step S809, in continuation from the assessment in step S808 that the host vehicle is forward from the designated vehicle, the interoperation pattern (C) is selected from among the interoperation patterns (A) to (F) shown in FIG. 3.

In step S810, in continuation form the assessment in step S808 that the host vehicle is rearward from the designated vehicle, the interoperation pattern (F) is selected from among the interoperation patterns (A) to (F) shown in FIG. 3.

In step S811, in continuation from the assessment in step S807 that the adjacent lane is not more crowded, an assessment is made as to whether the host vehicle lane is more crowded than the adjacent lane. When the assessment is YES (the host vehicle lane is more crowded), the process advances to step S812; when the assessment is NO (the host vehicle lane is not more crowded), the process advances to step S815.

When the difference between the degree of crowding in the host vehicle lane and the degree of crowding in the adjacent lane is greater than or equal to a threshold value, it is assessed that the host vehicle lane is more crowded.

In step S812, in continuation from the assessment in step S811 that the host vehicle lane is more crowded, an assessment is made as to whether the host vehicle is forward from the designated vehicle. When the assessment is YES (the host vehicle is forward from the designated vehicle), the process advances to step S813; when the assessment is NO (the host vehicle is rearward from the designated vehicle), the process advances to step S814.

In step S813, in continuation from the assessment in step S812 that the host vehicle is forward from the designated vehicle, the interoperation pattern (A) is selected from among the interoperation patterns (A) to (F) shown in FIG. 3.

In step S814, in continuation from the assessment in step S812 that the host vehicle is rearward from the designated vehicle, the interoperation pattern (D) is selected from among the interoperation patterns (A) to (F) shown in FIG. 3.

In step S815, in continuation from the assessment in step S811 that the host vehicle lane is not more crowded, lane change risk values are calculated for each of the interoperation patterns (A) to (F) shown in FIG. 3, and the process advances to step S816.

The lane change risk values R are calculated using the following formula, as described in regard to step S4:

$$R=f(La,Lo,Sa,So,Pa,Po).$$

In step S816, in continuation from the calculation in step S815 of the lane change risk values, the smallest value is selected from among the lane change risk values for each of the interoperation patterns (A) to (F), and an assessment is made as to whether the selected smallest risk value is greater than or equal to a threshold value. When the assessment is YES (the risk value is greater than or equal to the threshold value), the process advances to step S817; when the assessment is NO (the risk value is less than the threshold value), the process advances to step S818.

Situations when the pattern (B) or (E) has been selected as the interoperation pattern for which the lane change risk value R is smallest are excluded from the assessment as to whether the risk value is greater than or equal to the threshold value. Specifically, when any of the patterns (A), (C), (D), and (F), in which times at which the host vehicle and the designated vehicle start a lane change are made to differ from each other, has been selected, an assessment is made as to whether the risk value is greater than or equal to the threshold value.

In step S817, in continuation from the assessment in step S816 that the risk value is greater than or equal to the threshold value, a time difference between the time at which the designated vehicle starts a lane change and the time at which the host vehicle starts a lane change is corrected from a preset reference time, and the process advances to step S818.

In the "correction of the time difference," in cases where the lane change risk value R is greater than or equal to the threshold value, the time difference between the time at which the designated vehicle starts a lane change and the time at which the host vehicle starts a lane change is set to a lower time difference commensurately with a higher magnitude of the lane change risk value R.

In step S818, in continuation from the assessment in step S816 that the risk value is less than or equal to the threshold value or the correction in step S817 of the time difference, the interoperation pattern for which the lane change risk value R is smallest is selected from among the interoperation patterns (A) to (F).

The action in the first embodiment is described next in each of "Lane Change Control Action," "Lane-Change-Target-Setting Action," and "Lane Change Operation Determination Action." Below, the host vehicle lane is established as L1, the host vehicle is established as V1, the adjacent lane is established as L2, the designated vehicle is established as V2, another vehicle in the host vehicle lane is established as V3, another vehicle in the adjacent lane is established as V4, and the dead point is established as D.P.

Lane Change Control Action

In the device disclosed in patent document 1, in cases where a host vehicle performs a lane change, it is expected that other vehicles will decelerate or perform lane changes to lanes other than the host vehicle travel lane, and surrounding spaces between other vehicles are sensed. However, patent document 1 does not disclose a method in which the host vehicle is caused to make a lane change to an adjacent lane when the sensed surrounding spaces between other vehicles are not sufficient. Therefore, in a scenario in which the host vehicle is to make a lane change to an adjacent lane in a road having an X-shaped merge, or a plurality of lanes, the host vehicle will be unable to make the lane change in cases where there is not a sufficient area of space before the lane change.

For example, in the device disclosed in patent document 1, when the host vehicle is to make a lane change to an adjacent lane due to a driver request or a system request, it is impossible to perform the lane change when it is impossible to ensure a space in the adjacent lane for the host vehicle to cut into through a lane change. For example, when a plurality of other vehicles are traveling at substantially equal intervals in an adjacent lane adjacent to the host vehicle on a road having an X-shaped merge section, as shown in FIG. 6, sufficient space for the host vehicle to cut into the adjacent lane through a lane change cannot be ensured, and it is impossible to perform the lane change. In addition, when the host vehicle stops in order to perform a lane change and waits until a sufficient space for cutting in can be ensured, the host vehicle becomes an obstacle to succeeding vehicles that travel in the host vehicle lane, thereby causing congestion.

The present invention was contrived in view of the problem described above. In the present invention, whether there is a request from the host vehicle V1 to make a lane change to the adjacent lane L2 is detected, and in cases where it has been detected that there is a request from the host vehicle V1 to make a lane change, whether there is any intent for the other vehicle V4 traveling in the adjacent lane L2 to make a lane change heading toward the host vehicle lane L1 is detected. In cases where it has been detected that there is an intent for the other vehicle V4 to make a lane change heading toward the host vehicle lane L1, the lane-change-intending other vehicle V4 is established as a vehicle V2 designated for a place-swapping lane change. A lane change control method is employed in which the position (relative position) of a vacant area that will be created due to the lane change by the designated vehicle V2 is set as a target lane change to be made by the host vehicle V1.

Specifically, when it is assessed that there is no request from the host vehicle V1 to make a lane change, the process in the flow chart shown in FIG. 4 advances from S1 to the end. When it is assessed that there is a request from the host vehicle V1 to make a lane change but there is no lane-change-intending other vehicle V4, the process in the flow chart shown in FIG. 4 advances from S1 through S2 to the end. In both of these cases, for example, a command to continue the autonomous driving control without modification and to carry out autonomous driving travel is outputted in the host vehicle V1, without performance of a place-swapping lane change.

However, when it has been assessed that there is a request from the host vehicle V1 to make a lane change and there is a lane-change-intending vehicle V4, the process in the flow chart shown in FIG. 4 advances from S1 through S2, S3, (S4, S5), S6, S7, S8, and S9 to S10. A vehicle V2 designated for the place-swapping lane change is determined in S6, a target lane change to be made by the host vehicle V1 is set in S7, the lane change operation of the host vehicle V1 and the designated vehicle V2 is determined in S8, and the lane change control is executed in S9. The flow advancing from S9 to S10 is repeated until the lane change control is complete. When the lane change control is complete, the process advances from S10 to the end.

For example, an action for a lane change involving a swapping of places by the host vehicle V1 and the designated vehicle V2 on a road having an X-shaped merge location is described on the basis of FIG. 6. When the host vehicle V1 requests a lane change at a position immediately in front of the X-shaped merge location, another vehicle V4 having a turn signal illuminated is present in the adjacent lane L2 at the same timing. In this case, the other vehicle V4 having the turn signal illuminated is recognized as a lane-change-intending vehicle, and this other vehicle V4 is determined to be the vehicle V2 designated for the place-swapping lane change. The designated vehicle V2 is to make a lane change to the host vehicle lane L1, as shown by an arrow extending from the designated vehicle V2 in FIG. 6. In this instance, the host vehicle V1 establishes the position of a vacant area that will be created due to a lane change by the designated vehicle V2 (relative position of a vacant area that moves between the other vehicle V4-2 and the other vehicle V4-3 due to travel), within the adjacent lane L2, as a target for a lane change, and makes a lane change to the adjacent lane L2, as shown by an arrow extending from the host vehicle V1 in FIG. 6. Thus, the lane-change-intending other vehicle is established as the vehicle V2 designated for the place-swapping lane change, and the position (relative position) of the vacant area that will be created due to the lane change by the designated vehicle V2 is set as the target lane change to be made by the host vehicle V1.

As a result, a configuration is adopted in which, in a scenario in which the host vehicle V1 requests a lane change to the adjacent lane L2, it is possible to make the lane change to the position of the designated vehicle V2, which makes a lane change to the host vehicle lane L1, even in situations where there is not a sufficient area of space before the lane change made by the host vehicle V1. Thus, in situations where a plurality of other vehicles V4 are traveling at substantially equal intervals in the adjacent lane L2 for which a lane change was requested by the host vehicle V1 on a road having an X-shaped merge, as shown in FIG. 6, for example, sufficient space for the host vehicle V1 to cut into the adjacent lane L2 through a lane change cannot be ensured. However, even in situations where space for the host vehicle V1 to cut into the adjacent lane L2 cannot be ensured, it is possible for the host vehicle V1 and the designated vehicle V2 to make a lane change by a swapping of places. In addition, situations where the host vehicle V1 stops in order to make a lane change and waits until a sufficient space for cutting into the adjacent lane L2 can be ensured are eliminated. Therefore, it is possible to prevent the host vehicle V1 from becoming an obstacle to succeeding vehicles that travel in the host vehicle lane and causing congestion, and the lane change does not serve as a factor in obstructing traffic flows. In addition, it is possible to suppress fuel consumption of the host vehicle V1. Furthermore, it is also possible to reduce stress imparted to a passenger in the host vehicle V1.

Lane-Change-Target-Setting Action

Figure 7:
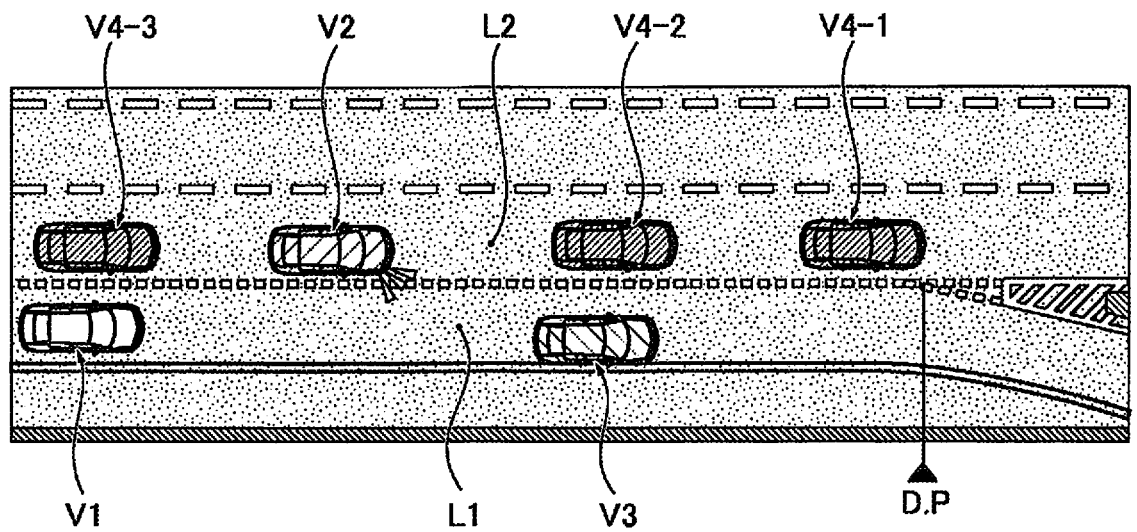
FIG. 7 is an action schematic diagram showing an action for determining a vehicle designated for a place-swapping lane change in a case where one lane-change-intending other vehicle is present in an adjacent lane, and an action for setting a target for a lane change made by the host vehicle, on a road having an X-shaped merge location.
Figure 8:
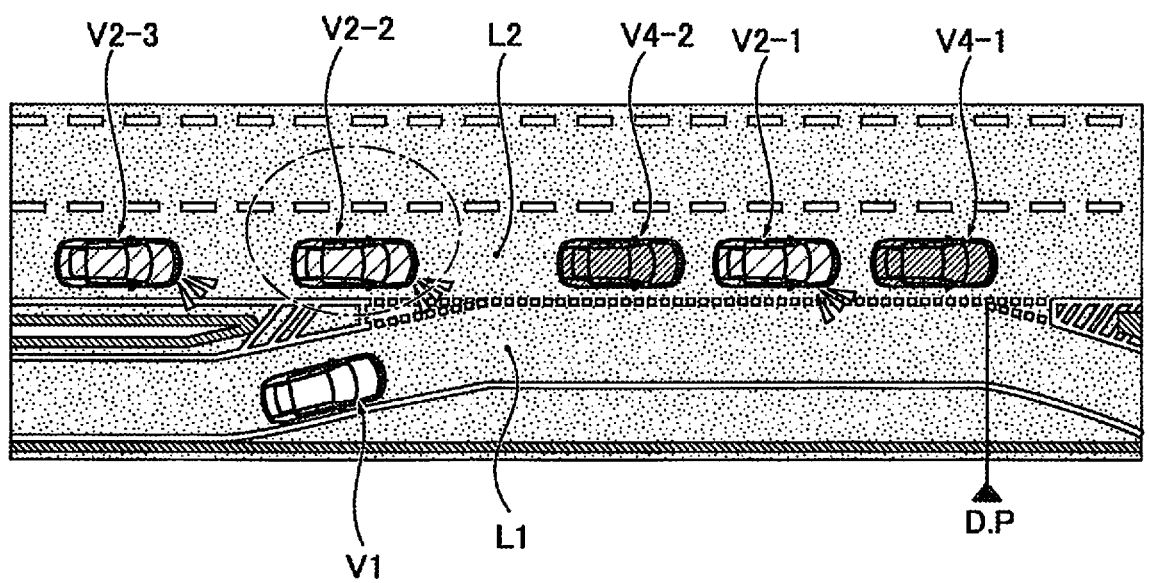
FIG. 8 is an action schematic diagram showing an action for determining a vehicle designated for a place-swapping lane change in a case where three lane-change-intending other vehicles are present in an adjacent lane, and an action for setting a target for a lane change made by the host vehicle, on a road having an X-shaped merge location.

An action for determining the vehicle V2 designated for the place-swapping lane change on a road having an X-shaped merge location, and an action for setting the target lane change to be made by the host vehicle V1, are described on the basis of FIGS. 7 and 8.

When there is a request from the host vehicle V1 to make a lane change and there is one lane-change-intending other vehicle V4, the process in the flow chart shown in FIG. 4 advances from S1 through S2, S3, and S6 to S7. The one other vehicle V4 is determined as a vehicle V2 designated for the place-swapping lane change in S6. The position (relative position) of a vacant area in the adjacent lane L2 that will be created due to a lane change by the designated vehicle V2 is set as the target lane change to be made by the host vehicle V1 in S7.

Specifically, when there is a request from the host vehicle V1 to make a lane change, and three other vehicles V4-1, V4-2, V4-3 and one vehicle-of-interest candidate for which a turn signal is illuminated are traveling in the adjacent lane L2 as shown in FIG. 7, the one vehicle-of-interest candidate is determined as the designated vehicle V2. The position (relative position) of a vacant area that will be created due to a lane change by the designated vehicle V2 and will be formed between the other vehicle V4-2 and the other vehicle V4-3 in the adjacent lane L2 is set as the target lane change to be made by the host vehicle V1.

When there is a request from the host vehicle V1 to make a lane change and there are a plurality of lane-change-intending other vehicles V4, the process in the flow chart shown in FIG. 4 advances from S1 through S2, S3, S4, S5, and S6 to S7. The lane change risk values R for each of the plurality of other vehicles V4 are calculated in S4. The other vehicle having the lowest risk value among the lane change risk values of the plurality of lane-change-intending other vehicles is selected as a vehicle-of-interest candidate in S5. The vehicle-of-interest candidate having the lowest lane change risk value R is determined as the vehicle V2 designated for the place-swapping lane change in S6.

Specifically, when there is a request from the host vehicle V1 to make a lane change, and two other vehicles V4-1, V4-2 and three vehicle-of-interest candidates V2-1, V2-2, V2-3 for which a turn signal is illuminated are traveling in the adjacent lane (*4) as shown in FIG. 8, the vehicle-of-interest candidate V2-2 having the lowest lane change risk value R is determined as the designated vehicle V2. The position (relative position) of a vacant area that will be created due to a lane change by the designated vehicle V2 and will be formed between the other vehicle V4-2 and the vehicle-of-interest candidate V2-3 in the adjacent lane L2 is set as the target lane change to be made by the host vehicle V1.

Thus, when there are a plurality of lane-change-intending other vehicles V4, the vehicle-of-interest candidate V2-2 having the lowest lane change risk value R is determined as the designated vehicle V2. Therefore, in a scenario in which a lane change involving a swapping of places by the host vehicle V1 and the designated vehicle V2 is performed, it is possible to smoothly perform the place-swapping lane change with sufficient spatial and temporal margins.

Lane Change Operation Determination Action 1

In cases where the dead point arrival prediction time is less than or equal to the threshold value, the process in the flow chart shown in FIG. 5 advances from S801 to S802. In S802, the lane change by the host vehicle V1 is started immediately without selecting any of the interoperation patterns (A) to (F).

Specifically, when the pattern for making a lane change involving a swapping of places by the host vehicle V1 and the designated vehicle V2 is stipulated in each of the interoperation patterns (A) to (F), if the dead point arrival prediction time is less than or equal to the threshold value, the lane change by the host vehicle V1 must be abandoned. Specifically, any of the interoperation patterns (A) to (F) is selected, and there is no temporal margin for making the place-swapping lane change according to the selected pattern.

However, in cases of, for example, a road that merges in an X shape, starting the lane change by the host vehicle V1 immediately when it has been assessed that the dead point arrival prediction time is less than or equal to the threshold value makes it possible to perform a lane change involving a swapping of places by the host vehicle V1 and the designated vehicle V2. As a result, in a scenario in which the dead point arrival prediction time is less than or equal to the threshold value, it is possible to perform a lane change by the host vehicle V1 by handling this scenario as an exception to the stipulation of interoperation patterns between the host vehicle V1 and the designated vehicle V2 in each of the patterns (A) to (F).

Lane Change Operation Determination Action 2

In cases where the dead point arrival prediction time is greater than the threshold value, but there are no objects present in front of or behind the host vehicle V1 or the designated vehicle V2, the process in the flow chart shown in FIG. 5 advances from S801 through S803 to S804. In S804, the change in speed from the current speed of the host vehicle V1 when the place-swapping lane change is performed is calculated for each of the patterns (A) to (F), and the interoperation pattern for which the change in speed is smallest is selected.

Specifically, when the pattern for making a lane change involving a swapping of places by the host vehicle V1 and the designated vehicle V2 is stipulated in each of the interoperation patterns (A) to (F), in cases where there are no objects in front of or behind the host vehicle V1 or the designated vehicle V2, any of the patterns (A) to (F) can be selected. However, when a pattern is appropriately selected, it is necessary to cause the speed of the host vehicle V1 to transition from a deceleration to acceleration, or to transition from acceleration to deceleration.

However, in cases where no objects are present in front of or behind the host vehicle V1 or the designated vehicle V2, selecting the interoperation pattern for which the change in speed is smallest minimizes the change in speed of the host vehicle V1 in the place-swapping lane change. As a result, in a scenario in which no objects are present in front of or behind the host vehicle V1 or the designated vehicle V2, it is possible to minimize the change in speed of the host vehicle V1 in the place-swapping lane change when the interoperation pattern of the host vehicle V1 and the designated vehicle V2 is stipulated in each of the patterns (A) to (F).

Lane Change Operation Determination Action 3

In cases where the dead point arrival prediction time is greater than the threshold value and an object is present in front of or behind the host vehicle V1 or the designated vehicle V2, but the surrounding environment conforms to any learned categorization result, the process in the flow chart shown in FIG. 5 advances from S801 through S803 and S805 to S806. In S806, the pattern corresponding to the assessed categorization result from among the interoperation patterns (A) to (F) is read out from the discriminator 40f and is selected.

Specifically, when the pattern for making a lane change involving a swapping of places by the host vehicle V1 and the designated vehicle V2 is stipulated in each of the interoperation patterns (A) to (F), if the lane change risk values R are to be calculated for all of the patterns (A) to (F) and the pattern having the smallest risk value is to be selected, the calculation becomes troublesome.

However, attention is drawn to the fact that stipulating the pattern in each of the interoperation patterns (A) to (F) makes it possible to use the pattern in a learning control. Specifically, the categorization results pertaining to the surrounding environment that includes the host vehicle V1 and the designated vehicle V2, and the interoperation pattern selected for each categorization result, can be stored and saved in the discriminator 40f each time [the host vehicle V1] undergoes a lane change involving a swapping of places by the host vehicle V1 and the designated vehicle V2. As a result, in a scenario in which [the host vehicle V1] has in the past undergone the same environment as the surrounding environment that includes the host vehicle V1 and the designated vehicle V2, using the learning result in selection of the interoperation pattern for the host vehicle V1 and the designated vehicle V2 makes it possible to easily perform a process to select an operation pattern in a short period of time.

Lane Change Operation Determination Action 4

A situation is addressed in which the dead point arrival prediction time is greater than the threshold value, an object is present in front of or behind the host vehicle V1 or the designated vehicle V2, and the surrounding environment does not conform to any learned categorization result. In cases where these three conditions are fulfilled, and where the adjacent lane L2 is more crowded than the host vehicle lane L1 and the host vehicle V1 is present forward from the designated vehicle V2, the procedure in the flow chart shown in FIG. 5 advances from S801 through S803, S805, S807, and S808 to S809. In S809, the interoperation pattern (C) is selected from among the interoperation patterns (A) to (F) shown in FIG. 3. In cases where the three conditions described above are fulfilled, and where the adjacent lane L2 is more crowded than the host vehicle lane L1 and the host vehicle V1 is present rearward from the designated vehicle V2, the procedure in the flow chart shown in FIG. 5 advances from S801 through S803, S805, S807, and S808 to S810. In S810, the interoperation pattern (F) is selected from among the interoperation patterns (A) to (F) shown in FIG. 3.

Specifically, when the adjacent lane L2 is more crowded than the host vehicle lane L1, if the designated vehicle V2 first leaves the adjacent lane through a lane change, the vacant area is ensured, and the host vehicle V1 then enters the vacant area through a lane change, it is possible to smoothly perform the place-swapping lane change. Specifically, when the pattern for making a lane change involving a swapping of places by the host vehicle V1 and the designated vehicle V2 is stipulated in each of the interoperation patterns (A) to (F), the patterns (A), (B), (D), and (E) are excluded from among the patterns (A) to (F).

Figure 9:
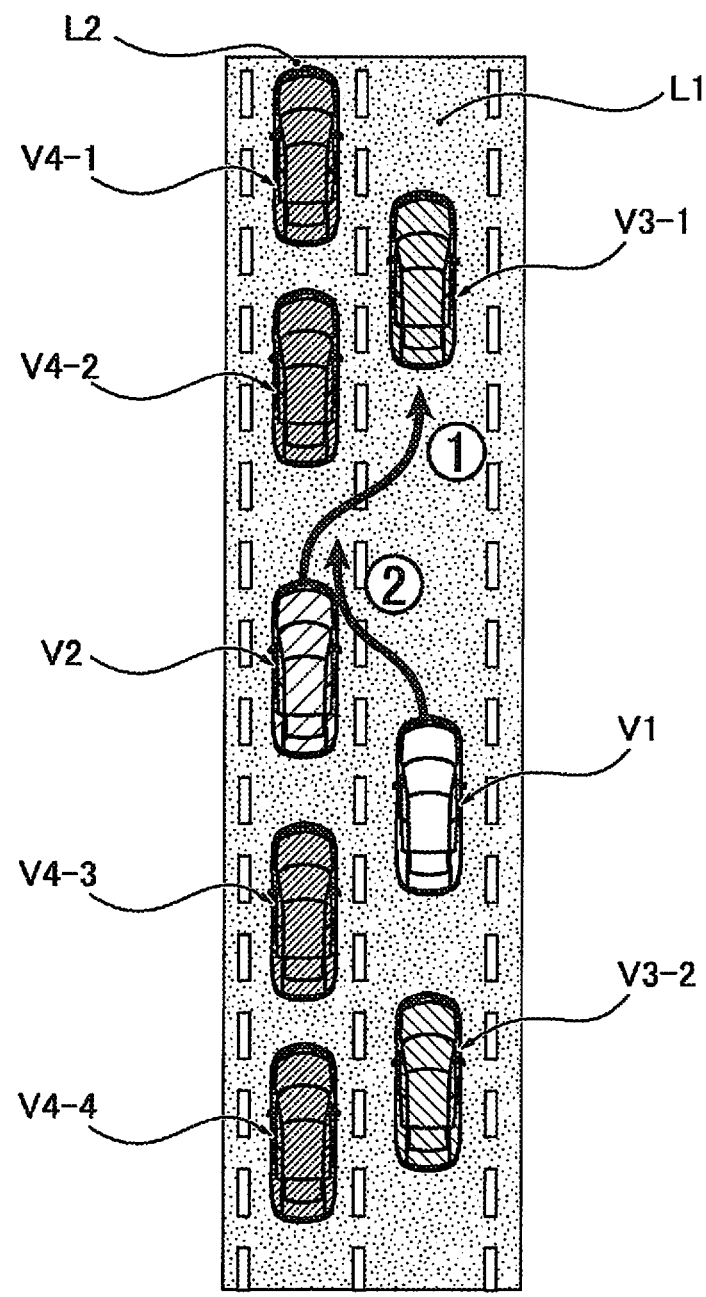
FIG. 9 is an action schematic diagram showing a lane change operation determination action for selecting an interoperation pattern according to the degree of crowding of the host vehicle lane and the adjacent lane on a road having a plurality of lanes.

However, in cases where the adjacent lane L2 is more crowded than the host vehicle lane L1 and the host vehicle V1 is present forward from the designated vehicle V2, the interoperation pattern (C) is selected. Moreover, in cases where the adjacent lane L2 is more crowded than the host vehicle lane L1 and the host vehicle V1 is present rearward from the designated vehicle V2, the interoperation pattern (F) is selected, as shown in FIG. 9. Therefore, due to the host vehicle V1 being positioned rearward from the designated vehicle V2 and the lane change by the host vehicle V1 being started after that of the designated vehicle V2, the designated vehicle V2 first leaves the adjacent lane through a lane change, the vacant area is ensured, and the place-swapping lane change is smoothly made. As a result, in a scenario in which the adjacent lane L2 is more crowded than the host vehicle lane L1, is it possible to smoothly perform the place-swapping lane change through selection of a suitable pattern when the interoperation pattern of the host vehicle V1 and the designated vehicle V2 is stipulated in each of the patterns (A) to (F).

Lane Change Operation Determination Action 5

A situation is addressed in which the dead point arrival prediction time is greater than the threshold value, an object is present in front of or behind the host vehicle V1 or the designated vehicle V2, and the surrounding environment does not conform to any learned categorization result. In cases where these three conditions are fulfilled, and where the host vehicle lane L1 is more crowded than the adjacent lane L2 and the host vehicle V1 is present forward from the designated vehicle V2, the process in the flow chart shown in FIG. 5 advances from S801 through S803, S805, S807, S811, and S812 to S813. In S813, the interoperation pattern (A) is selected from among the interoperation patterns (A) to (F). In cases where the three conditions described above are fulfilled, and where the host vehicle lane L1 is more crowded than the adjacent lane L2 and the host vehicle V1 is present rearward from the designated vehicle V2, the process in the flow chart shown in FIG. 5 advances from S801 through S803, S805, S807, S811, and S812 to S814. In S814, the interoperation pattern (D) is selected from among the interoperation patterns (A) to (F).

Specifically, when the host vehicle lane L1 is more crowded than the adjacent lane L2, if the host vehicle V1 first leaves the crowded host vehicle lane L1 through a lane change, and the designated vehicle V2 then ensures the vacant area of the host vehicle V1 through a lane change, it is possible to smoothly make the place-swapping lane change. Specifically, when the pattern for making a lane change involving a swapping of places by the host vehicle V1 and the designated vehicle V2 is stipulated in each of the interoperation patterns (A) to (F), the patterns (B), (C), (E), and (F) are excluded from among the patterns (A) to (F).

However, in cases where the host vehicle lane L1 is more crowded than the adjacent lane L2 and the host vehicle V1 is present forward from the designated vehicle V2, the interoperation pattern (A) is selected. Moreover, in cases where the host vehicle lane L1 is more crowded than the adjacent lane L2 and the host vehicle V1 is present rearward from the designated vehicle V2, the interoperation pattern (D) is selected. As a result, in a scenario in which the host vehicle lane L1 is more crowded than the adjacent lane L2, is it possible to smoothly perform the place-swapping lane change through selection of a suitable pattern when the interoperation pattern of the host vehicle V1 and the designated vehicle V2 is stipulated in each of the patterns (A) to (F).

Lane Change Operation Determination Action 6

A situation is addressed in which the dead point arrival prediction time is greater than the threshold value, an object is present in front of or behind the host vehicle V1 or the designated vehicle V2, and the surrounding environment does not conform to any learned categorization result. In cases where these three conditions are fulfilled, and where the difference between the degrees of crowding of the host vehicle lane L1 and the adjacent lane L2 is less than or equal to a threshold value, the process in the flow chart shown in FIG. 5 advances from S801 through S803, S805, S807, S811, and S815 to S816. In S815, lane change risk values R are calculated for each of the interoperation patterns (A) to (F) shown in FIG. 3. In S816, the smallest value is selected from among the lane change risk values R for each of the interoperation patterns (A) to (F), and an assessment is made as to whether the selected smallest risk value R is greater than or equal to a threshold value. In cases where the assessment in S816 is that the lane change risk value R is less than the threshold value, the process advances from S816 to S818. In S818, the interoperation pattern for which the lane change risk value R is smallest is selected from among the interoperation patterns (A) to (F).

Specifically, when the pattern for making a lane change involving a swapping of places by the host vehicle V1 and the designated vehicle V2 is stipulated in each of the interoperation patterns (A) to (F), a variety of conditions are present as selection conditions pertaining to which pattern from among the patterns (A) to (F) is selected.

By contrast, the lane change risk values R are calculated for each of the interoperation patterns (A) to (F), and the operation pattern having the smallest value from among the calculated lane change risk values R (A) to R (F) is selected. As a result, in a scenario in which a lane change involving a swapping of places by the host vehicle V1 and the designated vehicle V2 is made, it is possible to increase the probability of success of lane changes and to perform the place-swapping lane change when the interoperation patterns of the host vehicle V1 and the designated vehicle V2 are stipulated in each of the patterns (A) to (F).

Figure 10:
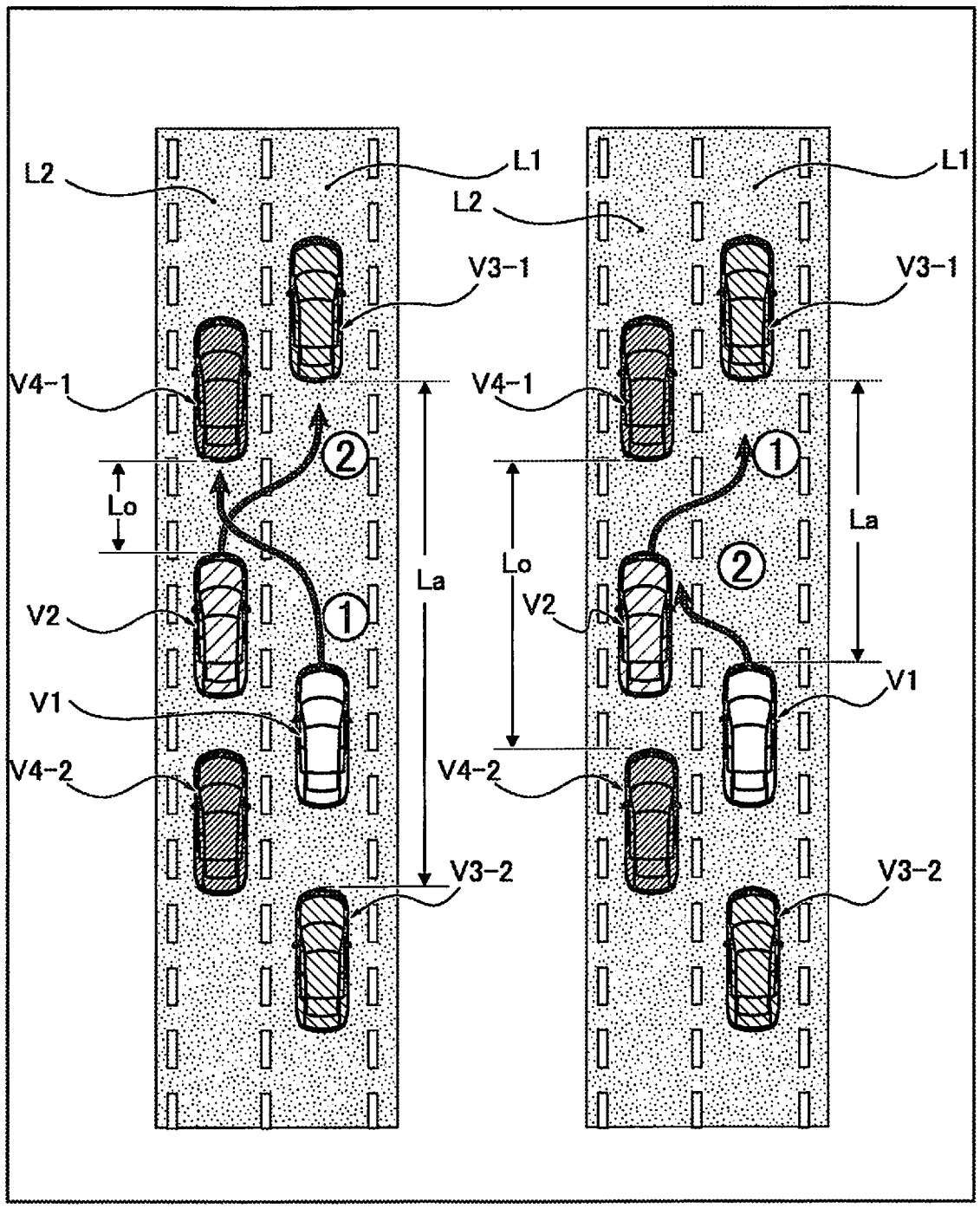
FIG. 10 is an action schematic diagram showing a lane change operation determination action for selecting an interoperation pattern according to the degree of risk on a road having a plurality of lanes.

For example, as shown in the left-side portion of FIG. 10, if the interoperation pattern (D) is selected when the host vehicle V1 is present rearward from the designated vehicle V2, the headway distance La to a vehicle traveling in the host vehicle lane widens, but the headway distance Lo to a vehicle traveling in the adjacent lane narrows. As shown in the right-side portion of FIG. 10, if the interoperation pattern (F) is selected when the host vehicle V1 is present rearward from the designated vehicle V2, the headway distance La to a vehicle traveling in the host vehicle lane narrows in comparison with a case where the interoperation pattern (D) is selected. However, the headway distance Lo to a vehicle traveling in the adjacent lane widens in comparison with a case where the interoperation pattern (D) is selected. Thus, in cases where the host vehicle V1 and the designated vehicle V2 have the relationship shown in FIG. 10, the interoperation pattern (F) is selected, the interoperation pattern (F) being such that the lane change risk value R reaches a low value due to equalization of the headway in which the length of the arrows depending on the lane change by the host vehicle V1 and the designated vehicle V2 decreases. The relationship shown is such that, if the movement distance depending on the lane change by the host vehicle V1 and the designated vehicle V2 (length of arrows in FIG. 10) is long, the lane change risk value R increases, and if the headway is short, the lane change risk value R increases.

However, in cases where the assessment in S816 is that the lane change risk value is greater than or equal to the threshold value, the process advances from S816 through S817 to S818. In S817, a time difference between the time at which the designated vehicle V2 starts a lane change and the time at which the host vehicle V1 starts a lane change is corrected from a preset reference time. In S818, the interoperation pattern for which the lane change risk value R is smallest is selected from among the interoperation patterns (A) to (F).

Figure 11:
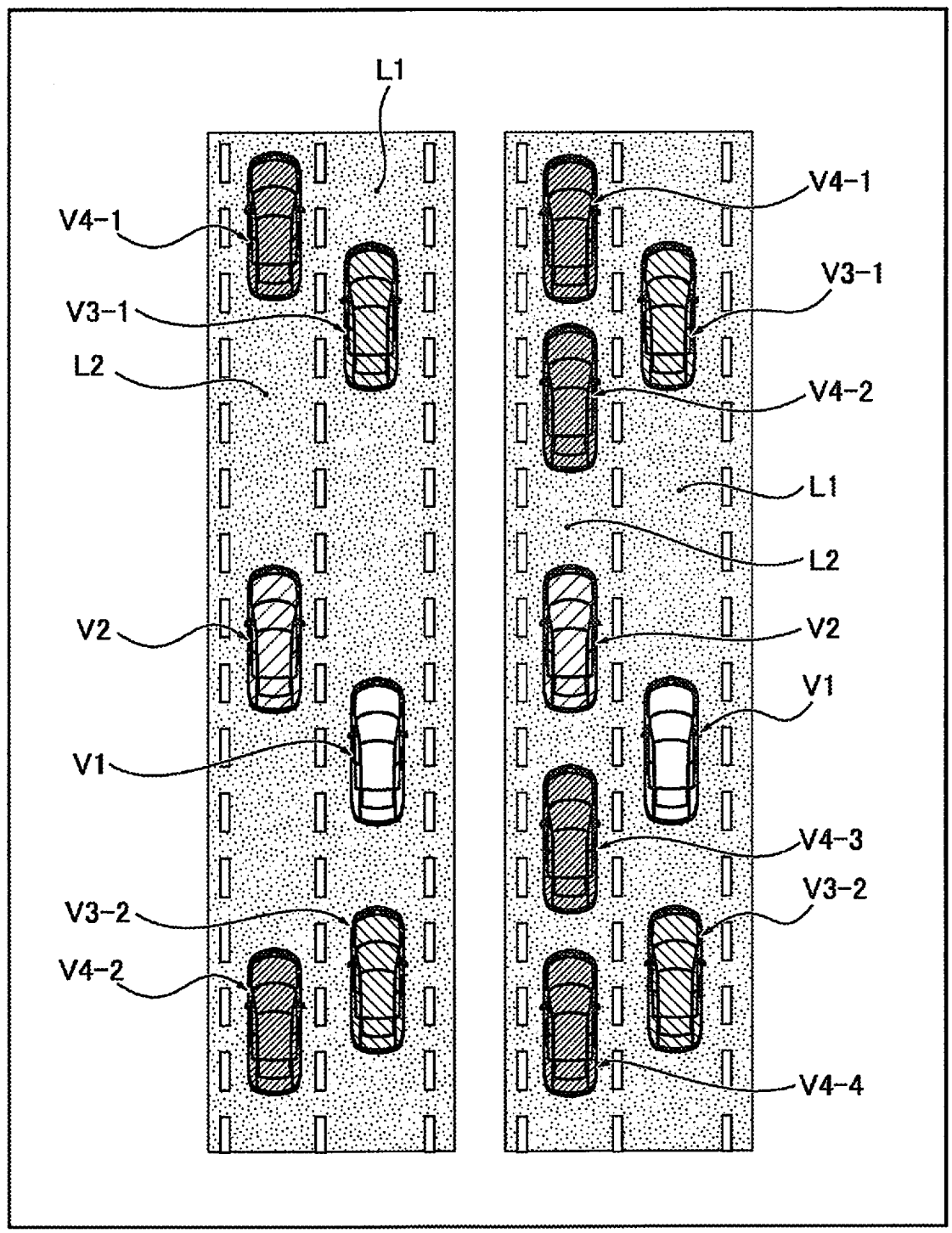
FIG. 11 is an action schematic diagram showing a time difference determination action for determining a time difference between times at which the host vehicle and the designated vehicle start a lane change in cases where the degree of risk is higher than a threshold value on a road having a plurality of lanes.

Specifically, a situation is addressed in which, when the interoperation pattern for which the lane change risk value is smallest is selected from among the interoperation patterns (A) to (F), the lane change risk value R itself is a low value, as shown in the left-side portion of FIG. 11. In this case, it is possible to increase the probability of success of lane changes even if the time difference between the time at which the designated vehicle V2 starts a lane change and the time at which the host vehicle V1 starts a lane change is set to the preset reference time (e.g., about 2.0 sec).

By contrast, a situation is addressed in which, when the interoperation pattern for which the lane change risk value R is smallest is selected from among the interoperation patterns (A) to (F), the lane change risk value R itself is a high value, as shown in the right-side portion of FIG. 11. In this case, when the time difference between the time at which the designated vehicle V2 starts a lane change and the time at which the host vehicle V1 starts a lane change is set to the preset reference time, it is impossible to increases the probability of success of lane changes. In cases where the lane change risk value is greater than or equal to the threshold value, the time difference between the time at which the designated vehicle V2 starts a lane change and the time at which the host vehicle V1 starts a lane change is corrected so as to reach a time (e.g., about 0.5 sec) that is shorter than the preset reference time. As a result, in a scenario in which the pattern for which the lane change risk value R is smallest is selected, reducing the time difference between the lane change start times when the lane change risk value is greater than or equal to the threshold value makes it possible to increase the probability of success of lane changes and to perform the place-swapping lane change. Correction of the time difference is limited to use when the pattern (A), (C), (D), or (F) is selected from among the interoperation patterns (A) to (F).

As described above, the driving assist method and the driving assist device of the first embodiment exhibit the effects listed below.

(1) A driving assist method in which a host vehicle V1 traveling in a host vehicle lane L1 comprises a controller (the lane change controller 40) that performs a lane change control to make a lane change to an adjacent lane L2 in which another vehicle V4 present in the surroundings of the host vehicle is traveling, wherein:

whether there is a request from the host vehicle V1 to make a lane change to the adjacent lane L2 is detected;

in cases where it has been detected that there is a request from the host vehicle V1 to make a lane change, whether there is any intent for another vehicle V4 traveling in the adjacent lane L2 to make a lane change heading toward the host vehicle lane L1 is detected;

in cases where it has been detected that there is an intent for the other vehicle V4 to make a lane change heading toward the host vehicle lane L1, the lane-change-intending other vehicle V4 is established as a vehicle V2 designated for a place-swapping lane change; and the position of a vacant area that will be created due to the lane change by the designated vehicle V2 is set as a target lane change to be made by the host vehicle V1 (FIG. 6). Thus, the lane-change-intending other vehicle V4 is established as the vehicle V2 designated for the place-swapping lane change, and the position of the vacant area that will be created due to the lane change by the designated vehicle V2 is set as the target lane change to be made by the host vehicle V1. As a result, it is possible to provide a driving assist method configured so that, in a scenario in which the host vehicle V1 requests a lane change to the adjacent lane L2, it is possible to make a lane change to the position of the designated vehicle V2, which makes a lane change to the host vehicle lane L1, even in situations where there is not a sufficient area of space before the lane change by the host vehicle V1. Specifically, it is possible to make a lane change to the vacant area that will be created due to the lane change by the designated vehicle V2 even when the vacant area for making the lane change to the adjacent lane L2 is small.

(2) The relative position of the designated vehicle V2 relative to the host vehicle V1 is detected, and the relative position of the designated vehicle V2 relative to the host vehicle V1 is established as the position of a vacant area and is set as the target lane change to be made by the host vehicle V1 (FIG. 2). Thus, the relative position of the designated vehicle V2 relative to the host vehicle V1 is detected, thereby making it possible to detect the position of a vacant area that will be created due to the lane change by the designated vehicle V2 even while the host vehicle V1 and the designated vehicle V2 are traveling. Therefore, it is possible to set the position of the vacant area that will be created due to the lane change by the designated vehicle V2 as the target for a lane change even while the host vehicle V1 and the designated vehicle V2 are traveling.

(3) In cases where a plurality of lane-change-intending other vehicles V4 are present, another vehicle V4 having the lowest lane change risk value R from among the plurality of other vehicles V4 is established as the vehicle V2 designated for a place-swapping lane change (FIG. 8). Thus, when there are a plurality of lane-change-intending other vehicles V4, the vehicle-of-interest candidate for which the lane change risk value R is smallest is set as the designated vehicle V2. As a result, in a scenario in which the lane change involving a swapping of places by the host vehicle V1 and the designated vehicle V2 is performed, it is possible to smoothly perform the place-swapping lane change with sufficient spatial and temporal margins.

(4) When the designated vehicle V2 is determined, the position of the host vehicle V1 is established as a position forward from or rearward from the designated vehicle V2, and a place-swapping lane change is started while a positional relationship has been assumed in which the host vehicle V1 and the designated vehicle V2 are offset in the front-rear direction (FIG. 3). Thus, because the possibility that the vehicles will interfere with each other is greater if the place-swapping lane change is started while the host vehicle V1 and the designated vehicle V2 are horizontally aligned, a configuration is adopted in which the place-swapping lane change is started with a positional relationship assumed in which the host vehicle V1 and the designated vehicle V2 are offset in the front-rear direction. As a result, in a scenario in which the lane change involving a swapping of places by the host vehicle V1 and the designated vehicle V2 is started, it is possible to start the place-swapping lane change in a manner in which interference between the host vehicle V1 and the designated vehicle V2 is minimized.

(5) Interoperation patterns for the lane change made by the host vehicle V1 and the designated vehicle V2 are divided into six interoperations patterns (A) to (F); and in cases where the target lane change to be made by the host vehicle V1 is set, one pattern is selected from among the interoperation patterns (A) to (F), and a lane change operation of the host vehicle V1 is determined (FIG. 3). Thus, because basic interoperations for the lane change made by the host vehicle V1 and the designated vehicle V2 are established, the interoperations are divided into the six interoperation patterns (A) to (F) beforehand. As a result, in a scenario in which the lane change involving a swapping of places by the host vehicle V1 and the designated vehicle V2 is performed, it is possible to economize a process for determining the interoperation pattern of the host vehicle V1 and the designated vehicle V2 for each scenario, and to reduce a computation processing load during travel.

(6) In cases where the adjacent lane L2 in which the designated vehicle V2 is traveling is more crowded than the host vehicle lane L1 in which the host vehicle V1 is traveling, the probability of selecting the interoperation pattern in (C) or (F) is increased (FIG. 5). Thus, if the interoperation pattern in (C) or (F), in which the designated vehicle V2 first leaves the adjacent lane L2 through a lane change and the vacant area for the host vehicle V1 is ensured, is selected when the adjacent lane L2 is more crowded, the place-swapping lane change is smoothly made. As a result, in a scenario in which the adjacent lane L2 is more crowded than the host vehicle lane L1, is it possible to smoothly perform the place-swapping lane change through selection of a suitable pattern when the interoperation pattern of the host vehicle V1 and the designated vehicle V2 is stipulated in each of the patterns (A) to (F).

(7) In cases where the host vehicle lane L1 in which the host vehicle V1 is traveling is more crowded than the adjacent lane L2 in which the designated vehicle V2 is traveling, the probability of selecting the interoperation pattern in (A) or (D) is increased (FIG. 5). Thus, if the interoperation pattern in (A) or (D), in which the host vehicle V1 first leaves the host vehicle lane L1 through a lane change and the vacant area for the designated vehicle V2 is ensured, is selected when the host vehicle lane L1 is more crowded, the place-swapping lane change is smoothly made. As a result, in a scenario in which the host vehicle lane L1 is more crowded than the adjacent lane L2, is it possible to smoothly perform the place-swapping lane change through selection of a suitable pattern when the interoperation pattern of the host vehicle V1 and the designated vehicle V2 is stipulated in each of the patterns (A) to (F).

(8) Lane change risk values R for the host vehicle V1 and the designated vehicle V2 are calculated for each of the six interoperation patterns (A) to (F); and one interoperation pattern having the smallest value from among the lane change risk values R is selected, and the lane change operation of the host vehicle V1 is determined (FIG. 10). Thus, the lane change risk values R are calculated for each of the interoperation patterns (A) to (F), and a configuration is adopted in which the interoperation pattern having the smallest value from among the calculated lane change risk values R (A) to R (F) is selected. As a result, in a scenario in which a lane change involving a swapping of places by the host vehicle V1 and the designated vehicle V2 is made, it is possible to increase the probability of success of lane changes and to perform the place-swapping lane change when the interoperation patterns of the host vehicle V1 and the designated vehicle V2 are stipulated in each of the patterns (A) to (F).

(9) In cases where a pattern in which the times at which the host vehicle V1 and the designated vehicle V2 start a lane change are caused to differ from each other is selected as the interoperation pattern, and where the lane change risk value R is greater than or equal to a threshold value, a time difference between the time at which the designated vehicle V2 starts a lane change and the time at which the host vehicle V1 starts a lane change is reduced commensurately with increases in the lane change risk value R (FIG. 11). Thus, in cases where the lane change risk value is greater than or equal to the threshold value, the time difference between the time at which the designated vehicle V2 starts a lane change and the time at which the host vehicle V1 starts a lane change is set to a time shorter than a preset reference time. As a result, in a scenario in which the pattern for which the lane change risk value R is smallest is selected, reducing the time difference between the lane change start times when the lane change risk value is greater than or equal to the threshold value makes it possible to increase the probability of success of lane changes and to perform the place-swapping lane change.

(10) A discriminator 40f is provided in which, when [the host vehicle V1] undergoes the lane change involving a swapping of places by the host vehicle V1 and the designated vehicle V2, the discriminator 40f stores and saves a result from categorizing a surrounding environment that includes the host vehicle V1 and the designated vehicle V2 for each selected interoperation pattern; and in cases where the target lane change to be made by the host vehicle V1 is set, an assessment is made as to whether the surrounding environment in that instance conforms to any categorization result derived by machine learning, and the interoperation pattern in the instance of the assessed categorization result is read out from the discriminator 40f and selected (FIG. 2). Thus, the categorization results pertaining to the surrounding environment that includes the host vehicle V1 and the designated vehicle V2, and the interoperation pattern selected for each categorization result, are stored and saved in the discriminator 40f each time [the host vehicle V1] undergoes a lane change involving a swapping of places by the host vehicle V1 and the designated vehicle V2. As a result, in a scenario in which [the host vehicle V1] has in the past undergone the same environment as the surrounding environment that includes the host vehicle V1 and the designated vehicle V2, using the learning result in selection of the interoperation pattern for the host vehicle V1 and the designated vehicle V2 makes it possible to easily perform a process to select an operation pattern in a short period of time.

(11) In cases where no object is present in front of or behind the host vehicle V1 or the designated vehicle V2, the interoperation pattern for which the change in speed of the host vehicle V1 is smallest is selected from among the six interoperation patterns (FIG. 5). Thus, the interoperation pattern for which the change in speed is lowest is selected in cases where no object is present in front of or behind the host vehicle V1 or the designated vehicle V2. As a result, in a scenario in which no objects are present in front of or behind the host vehicle V1 or the designated vehicle V2, it is possible to minimize the change in speed of the host vehicle V1 in the place-swapping lane change when the interoperation pattern of the host vehicle V1 and the designated vehicle V2 is stipulated in each of the patterns (A) to (F).

(12) If a dead point arrival prediction time until arrival at a dead point D.P, which is a position at a boundary of where the host vehicle V1 can make a lane change, is less than or equal to a threshold value, the lane change by the host vehicle V1 is started without selecting any of the interoperation patterns (FIG. 5). Thus, the lane change by the host vehicle V1 is started immediately when it has been assessed that the dead point arrival prediction time is less than or equal to the threshold value. As a result, in a scenario in which the dead point arrival prediction time is less than or equal to the threshold value, it is possible to perform a lane change by the host vehicle V1 by handling this scenario as an exception to the stipulation of interoperation patterns between the host vehicle V1 and the designated vehicle V2 in each of the patterns (A) to (F).

(13) A driving assist device in which a host vehicle V1 traveling in a host vehicle lane L1 is provided with a controller (the lane change controller 40) that performs a lane change control to make a lane change to an adjacent lane L2 in which another vehicle V4 present in the surroundings of the host vehicle is traveling, wherein the controller (the lane change controller 40) has:

a lane change request detection unit 40a that detects whether there is a request from the host vehicle V1 to make a lane change to the adjacent lane L2;

a lane change intent detection unit 40b that, in cases where it has been detected that there is a request from the host vehicle V1 to make a lane change, detects whether there is any intent for the other vehicle V4 traveling in the adjacent lane L2 to make a lane change heading toward the host vehicle lane L1; and a lane-change-target-setting unit 40c that, when it has been detected that there is an intent for the other vehicle V4 to make a lane change heading toward the host vehicle lane L1, establishes the lane-change-intending other vehicle V4 as a vehicle V2 designated for a place-swapping lane change, and sets the position of a vacant area that will be created due to the lane change by the designated vehicle V2 as a target lane change to be made by the host vehicle V1 (FIG. 2). Thus, the lane-change-intending other vehicle V4 is established as the vehicle V2 designated for the place-swapping lane change, and the position of a vacant area that will be created due to the lane change by the designated vehicle V2 is set as the target lane change to be made by the host vehicle V1. As a result, it is possible to provide a driving assist device configured so that, in a scenario in which the host vehicle V1 requests a lane change to the adjacent lane L2, it is possible to make the lane change to the position of the designated vehicle V2, which makes a lane change to the host vehicle lane L1, even in situations where there is not a sufficient area of space before the lane change made by the host vehicle V1.

The driving assist method and the driving assist device of the present invention are described above on the basis of the first embodiment. However, the present invention is not limited to this example in terms of specific configuration; various design changes or additions are permitted, provided that such modifications do not depart from the gist of the invention as in the claims.

In the first embodiment, an example is illustrated in which, in regard to the lane change operation determination unit 40d: interoperation patterns for lane changes made by the host vehicle V1 and the designated vehicle V2 are divided into six interoperation patterns (A) to (F); and, in cases where the target lane change to be made by the host vehicle V1 is set, one pattern is selected from among the interoperation patterns (A) to (F), and a lane change operation of the host vehicle V1 is determined. However, an example may be employed in which, in regard to the lane change operation determination unit, the interoperations for lane changes made by the host vehicle and the designated vehicle are determined without dividing the interoperations for lane changes made by the host vehicle and the designated vehicle into the six interoperation patterns (A) to (F).

In the first embodiment, an example is illustrated in which, in regard to the lane change operation determination unit 40d: in cases where the adjacent lane L2 in which the designated vehicle V2 is traveling is more crowded than the host vehicle lane L1 in which the host vehicle V1 is traveling, the interoperation pattern in (C) or (F) is selected; and in cases where the host vehicle lane L1 in which the host vehicle V1 is traveling is more crowded than the adjacent lane L2 in which the designated vehicle V2 is traveling, the interoperation pattern in (A) or (D) is selected. However, an example may be employed in which, in regard to the lane change operation determination unit, the probability of selecting the interoperation pattern in (C) or (F) is increased so that this interoperation pattern is more readily selected, or the probability of selecting the interoperation pattern in (A) or (D) is increased so that this interoperation pattern is more readily selected.

In the first embodiment, an example is illustrated in which the lane change risk value R is calculated using the formula R=f(La, Lo, Sa, So, Pa, Po). However, the lane change risk value may also be calculated in a manner that includes the state of surrounding vehicles, the time at which the host vehicle is predicted to arrive at the position of the designated vehicle, or the structure of the road. In addition, if vehicle-to-vehicle communication between the host vehicle and the designated vehicle is possible, a correction to reduce the lane change risk value may also be added. Specifically, if vehicle-to-vehicle communication between the host vehicle and the designated vehicle is possible, the speeds of the host vehicle and the designated vehicle can be harmonized during the place-swapping lane change. Furthermore, an example may be employed in which, when one pattern is selected from among the interoperation patterns (A) to (F) and the lane change operation of the host vehicle V1 is determined by the lane change operation determination unit, the degree of crowding, the dead point arrival prediction time, etc., are aggregated with the lane change risk value and determined. In this instance, a correction to increase or decrease the lane change risk value is performed in accordance with lane change operation determination conditions.

In the first embodiment, an example is illustrated in which the driving assist method and the driving assist device of the present invention are applied to an autonomously driven vehicle in which drive/braking/steering are autonomously controlled in accordance with selection of an autonomous driving mode. However, the driving assist method and the driving assist device of the present invention may also be applied to a driving assist vehicle that travels with some amount of driving performed by a driver from among drive driving/braking driving/steering driving being assisted. Furthermore, the driving assist method and the driving assist device of the present invention can also be applied to a driving assist vehicle in which a driver is made aware of a travel route, a stopping route, or a stopping position through a display on a monitor or through spoken instructions, whereby travel performed through manipulation by the driver is assisted in a visual or auditory manner.

The invention claimed is:

1. A driving assist method using a controller to perform a lane change control causing a host vehicle traveling in a host vehicle lane to make a lane change to an adjacent lane, the driving assist method comprising:
    detecting whether there is a request from the host vehicle to make the lane change to the adjacent lane;
    after detecting the request, detecting whether there is a lane-change-intending other vehicle that is traveling in the adjacent lane and intends to make a lane change towards the host vehicle lane;
    after detecting the lane-change-intending other vehicle, establishing the lane-change-intending other vehicle as a designated vehicle;
    after establishing the designated vehicle, detecting a relative position of the designated vehicle relative to the host vehicle;
    setting the relative position of the designated vehicle traveling in the adjacent lane as a target position for the lane change to the adjacent lane to be made by the host vehicle, the relative position of the designated vehicle being a position that will become a vacant area when the designated vehicle changes lanes toward the host vehicle lane; and
    performing the lane change control based on the target position.

2. The driving assist method according to claim 1, further comprising
    upon determining there are a plurality of other vehicles that are traveling in the adjacent lane and intending to make a lane change towards the host vehicle lane, calculating a lane change risk value with respect to each of the plurality of other vehicles and establishing one vehicle having a lowest lane change risk value among the plurality of other vehicles as the designated vehicle.

3. The driving assist method according to claim 1, further comprising
    controlling the host vehicle to be positioned forward or rearward of the designated vehicle and starting the lane change of the host vehicle from a state in which the host vehicle and the designated vehicle are offset in a front-rear direction.

4. The driving assist method according to claim 3, further comprising
    dividing interoperations for the lane changes to be made by the host vehicle and the designated vehicle into six interoperation patterns that include:

(A) the host vehicle being positioned forward of the designated vehicle and starting the lane change of the host vehicle before the lane change of the designated vehicle, (B) the host vehicle being positioned forward of the designated vehicle and starting the lane change of the host vehicle at the same time as the lane change of the designated vehicle, (C) the host vehicle being positioned forward of the designated vehicle and starting the lane change of the host vehicle after the lane change of the designated vehicle, (D) the host vehicle being positioned rearward of the designated vehicle and starting the lane change of the host vehicle before the lane change of the designated vehicle, (E) the host vehicle being positioned rearward of the designated vehicle and starting the lane change of the host vehicle at the same time as the lane change of the designated vehicle, and (F) the host vehicle being positioned rearward of the designated vehicle and starting the lane change of the host vehicle after the lane change of the designated vehicle;

selecting one pattern among the six interoperation patterns upon setting the position of the designated vehicle as the target position of the lane change;

performing the lane change control based on the one pattern.

5. The driving assist method according to claim 4, further comprising increasing a probability of selecting the pattern (C) or (F) upon determining that the adjacent lane is more crowded than the host lane.

6. The driving assist method according to claim 4, further comprising increasing a probability of selecting the pattern (A) or (D) upon determining that the host vehicle lane is more crowded than the adjacent lane.

7. The driving assist method according to claim 4, further comprising calculating a lane change risk value for the host vehicle and the designated vehicle for each of the six interoperation patterns; and selecting a pattern among the six interoperation patterns for which the lane change risk value is smallest as the one pattern.

8. The driving assist method according to claim 7, further comprising in a case where the pattern (A), (C), (D), or (F) is selected as the one pattern and the lane change risk value is greater than or equal to a threshold value, setting a time difference between a time at which the lane change of the designated vehicle starts and a time at which the lane change of the host vehicle starts to be shorter as the lane change risk value increases.

9. The driving assist method according to claim 4, further comprising using a discriminator to store a result from categorizing a surrounding environment that includes the host vehicle and the designated vehicle each time the lane change control is performed based on the target position for the lane change in accordance with one of the six interoperation patterns; and upon setting a new target position for a new lane change to be made by the host vehicle, assessing whether a current surrounding environment conforms to any categorization result stored by the discriminator and derived by machine learning.

10. The driving assist method according to claim 4, further comprising determining whether or not an object is present in front of or behind the host vehicle or the designated vehicle, upon determining no object is present in front of or behind the host vehicle or the designated vehicle, selecting a pattern for which a change in speed of the host vehicle is smallest from among the six interoperation patterns.

11. The driving assist method according to claim 4, further comprising starting the lane change by the host vehicle without selecting any of the six interoperation patterns upon determining that a dead-point-arrival prediction time is less than or equal to a threshold value, the dead-point-arrival prediction time being an amount of time until the host vehicle arrives at a dead point, the dead point being positioned at a boundary of where the host vehicle can make a lane change.

12. A driving assist device for a host vehicle traveling in a host vehicle lane, comprising:

a controller configured to execute a lane change control causing the host vehicle to make a lane change to an adjacent, the controller being further configured to:

detect whether there is a request from the host vehicle to make a lane change to the adjacent lane;

after detecting the request, detect whether there is a lane-change-intending other vehicle that is traveling in the adjacent lane and intends to make a lane change towards the host vehicle lane;

after detecting the lane-change-intending other vehicle, establish the lane-change-intending other vehicle as a designated vehicle;

after establishing the designated vehicle, detect a relative position of the designated vehicle relative to the host vehicle;

set the relative position of the designated vehicle traveling in the adjacent lane as a target position for the lane change to the adjacent lane to be made by the host vehicle, the relative position of the designated vehicle being a position that will become a vacant area when the designated vehicle changes lanes toward the host vehicle lane; and perform the lane change control based on the target position.

* * * * *